US012320178B2

(12) United States Patent
LeTourneau et al.

(10) Patent No.: US 12,320,178 B2
(45) Date of Patent: Jun. 3, 2025

(54) CABINET APPARATUS

(71) Applicant: Kohler Co., Kohler, WI (US)

(72) Inventors: Alexander V. LeTourneau, Sheboygan, WI (US); Swapnil Vasant Borade, Pune (IN); Zhongpeng Zha, Shanghai (CN); Linan Han, Shanghai (CN)

(73) Assignee: Kohler Co., Kohler, WI (US)

( * ) Notice: Subject to any disclaimer, the term of this patent is extended or adjusted under 35 U.S.C. 154(b) by 98 days.

(21) Appl. No.: 17/989,628

(22) Filed: Nov. 17, 2022

(65) Prior Publication Data

US 2024/0151083 A1 May 9, 2024

(30) Foreign Application Priority Data

Nov. 9, 2022 (CN) ........................ 202211398806.1

(51) Int. Cl.
*E05D 7/081* (2006.01)
*A47B 67/02* (2006.01)
*E05D 11/06* (2006.01)

(52) U.S. Cl.
CPC .............. *E05D 7/081* (2013.01); *A47B 67/02* (2013.01); *E05D 11/06* (2013.01);
(Continued)

(58) Field of Classification Search
CPC ..... E05D 7/081; E05D 11/06; E05Y 2600/40; E05Y 2600/622; E05Y 2900/20;
(Continued)

(56) References Cited

U.S. PATENT DOCUMENTS 41,664 A * 2/1864 Hoadley ................... E05D 3/02 16/377
1,455,550 A * 5/1923 Rodell .................... E05D 11/06 16/375
(Continued)

FOREIGN PATENT DOCUMENTS

CA 2218507 C 5/1998
CH 705813 A2 * 5/2013 ........... A47B 67/005
(Continued)

*Primary Examiner* — Andrew Roersma
(74) *Attorney, Agent, or Firm* — Lempia Summerfield Katz LLC

(57) ABSTRACT

A cabinet apparatus having a housing and a door. The housing defines a storage space having a front access opening. The door includes a first panel structure having a first sidewall panel having a first interior surface that partially defines the storage space and a first exterior surface and a tubular flange extending lengthwise along the first sidewall panel and protruding from the first exterior surface. A first hinge component is located on the tubular flange. The door includes a door body and a second hinge component thereon. The first and second hinge components are operably coupled to one another so that the door is pivotably mounted to the housing to be rotatable about a rotational axis between: (1) a closed position in which the door body encloses the front access opening; and (2) an open position in which the storage space is accessible via the front access opening.

19 Claims, 17 Drawing Sheets

(52) U.S. Cl.
CPC ..... *E05Y 2201/224* (2013.01); *E05Y 2600/40* (2013.01); *E05Y 2600/622* (2013.01); *E05Y 2900/20* (2013.01)

(58) Field of Classification Search
CPC . E05Y 2201/224; A47B 67/00; A47B 67/005; A47B 67/02
USPC .......................................... 16/374, 376, 377
See application file for complete search history.

(56) References Cited

U.S. PATENT DOCUMENTS

| | | | | | |
|---|---|---|---|---|---|
| 1,707,013 | A * | 3/1929 | Hoegger | A47B 67/02 | 312/351 |
| 1,786,073 | A * | 12/1930 | Marshall | A47B 67/02 | 49/378 |
| 2,347,981 | A * | 5/1944 | Apfelbaum | E05D 7/1061 | 16/374 |
| 2,578,096 | A | 12/1951 | Robert | | |
| 2,585,849 | A | 2/1952 | Oscar | | |
| 2,763,527 | A | 9/1956 | Irvin | | |
| 2,803,850 | A * | 8/1957 | Hooper | E05D 11/06 | 16/374 |
| RE24,498 | E | 7/1958 | Berger | | |
| 2,930,075 | A * | 3/1960 | Deutchman | E05D 11/06 | 16/375 |
| 3,159,439 | A | 12/1964 | George | | |
| 3,362,768 | A | 1/1968 | Robert et al. | | |
| 3,379,484 | A | 4/1968 | Ralph | | |
| 3,729,113 | A | 4/1973 | Lopatka | | |
| 3,807,824 | A * | 4/1974 | Hayes | A47B 67/005 | 312/224 |
| 4,058,861 | A | 11/1977 | Kruse | | |
| 4,083,150 | A | 4/1978 | Smith | | |
| 4,134,625 | A * | 1/1979 | Palka | E05D 7/081 | 312/227 |
| 4,239,310 | A * | 12/1980 | Benjamin | A47B 67/005 | 312/227 |
| 4,592,604 | A | 6/1986 | Wilke | | |
| 4,660,477 | A | 4/1987 | Kortering et al. | | |
| 4,867,511 | A * | 9/1989 | Katz | A47B 67/005 | 16/DIG. 43 |
| 4,899,077 | A | 2/1990 | Larson | | |
| 4,927,215 | A * | 5/1990 | Katz | A47B 67/005 | 312/224 |
| 4,976,450 | A | 12/1990 | Llefson | | |
| 5,108,165 | A | 4/1992 | Rorke | | |
| 5,165,780 | A * | 11/1992 | Katz | A47B 67/005 | 362/135 |
| 5,197,790 | A * | 3/1993 | Katz | E05D 11/082 | 16/339 |
| 5,267,786 | A * | 12/1993 | Aisley | E05F 1/066 | 52/785.1 |
| 5,647,651 | A | 7/1997 | Kim | | |
| 5,661,875 | A * | 9/1997 | Overcash | E05D 11/06 | 16/377 |
| 6,382,749 | B1 | 5/2002 | Stetson | | |
| 6,386,120 | B1 | 5/2002 | Nelson | | |
| 6,526,694 | B1 * | 3/2003 | Cosgrove | E05D 15/54 | 49/67 |
| 6,834,416 | B2 * | 12/2004 | Wang | B60P 1/43 | 16/389 |
| 7,439,453 | B2 | 10/2008 | Murano et al. | | |
| 7,876,488 | B2 | 1/2011 | Maeda et al. | | |
| 8,023,172 | B2 | 9/2011 | Ishii et al. | | |
| 8,134,767 | B2 | 3/2012 | Maeda | | |
| 8,231,187 | B2 | 7/2012 | Hoffman | | |
| 8,480,189 | B2 * | 7/2013 | Katz | E05D 5/0246 | 312/227 |
| 9,211,004 | B2 | 12/2015 | Diemel, Jr. et al. | | |
| 9,376,845 | B2 | 6/2016 | Sawaguchi | | |
| 9,598,887 | B2 | 3/2017 | Reed | | |
| 9,675,172 | B2 * | 6/2017 | Pandorf | A47B 67/02 | |
| 9,693,478 | B2 | 6/2017 | Ivey | | |
| 10,317,092 | B2 | 6/2019 | Desor et al. | | |
| 10,582,769 | B2 * | 3/2020 | Stanley, Jr. | F16B 1/00 | |
| 10,688,379 | B2 | 6/2020 | Stellenberg | | |
| 10,745,954 | B2 | 8/2020 | Mcgregor et al. | | |
| 10,900,266 | B2 | 1/2021 | Jeffries | | |
| 11,026,507 | B1 * | 6/2021 | George | A47B 67/005 | |
| 11,197,544 | B2 | 12/2021 | Phan et al. | | |
| 11,266,242 | B1 * | 3/2022 | Tooley | A47B 67/005 | |
| 2006/0119235 | A1 * | 6/2006 | Aisley | A47B 47/00 | 312/227 |
| 2007/0013278 | A1 | 1/2007 | Herber | | |
| 2007/0252494 | A1 | 11/2007 | Freedenberg | | |
| 2010/0269302 | A1 * | 10/2010 | Jagannathan | E05D 11/06 | 16/374 |
| 2010/0277043 | A1 | 11/2010 | Bloch et al. | | |
| 2012/0023706 | A1 * | 2/2012 | Fuller | E05D 11/06 | 16/374 |
| 2013/0020920 | A1 | 1/2013 | Weber | | |
| 2014/0132131 | A1 | 5/2014 | Thomas | | |
| 2014/0265768 | A1 * | 9/2014 | Diemel, Jr. | A47B 67/02 | 312/224 |
| 2015/0300075 | A1 | 10/2015 | Lyons | | |
| 2021/0148146 | A1 | 5/2021 | Bairagi et al. | | |
| 2021/0203799 | A1 | 7/2021 | Uji et al. | | |
| 2021/0259407 | A1 | 8/2021 | George et al. | | |
| 2021/0259413 | A1 * | 8/2021 | Lobello | A47B 81/065 | |

FOREIGN PATENT DOCUMENTS

| | | | | |
|---|---|---|---|---|
| DE | 202007014889 | U1 * | 1/2008 | A47B 67/02 |
| EP | 0167611 | A1 | 1/1986 | |
| EP | 2918195 | B1 | 9/2015 | |
| EP | 3379010 | A1 | 9/2018 | |
| ES | 1063392 | | 10/2006 | |
| GB | 683963 | A | 12/1952 | |
| GB | 978109 | A | 12/1964 | |
| GB | 2356029 | B | 5/2001 | |
| GB | 2492085 | A * | 12/2012 | A47B 67/005 |
| JP | S6134477 | Y2 | 10/1986 | |
| WO | WO2010011210 | | 1/2010 | |
| WO | WO2014168658 | | 10/2014 | |
| WO | WO2020178069 | A1 | 9/2020 | |

* cited by examiner

CABINET APPARATUS

CROSS REFERENCE TO RELATED APPLICATIONS

This application claims the benefit of Chinese National Patent Application No. 202211398806.1, filed on Nov. 9, 2022, the contents thereof hereby incorporated by reference herein in its entirety, for all purposes.

BACKGROUND

Cabinets are used throughout the home and in certain office environments to store items out of sight but in an easily accessible location. For example, medicine cabinets are typically hung in a bathroom and include a mirrored door. People typically store items related to personal hygiene in medicine cabinets, such as deodorant, toothpaste, toothbrushes, hairbrushes, and medication. Some users may choose to store cosmetics, hair curlers, hair dryers, and hair removal/shaving materials in the cabinet. Users may take advantage of the cabinet's mirrored door to apply cosmetics, apply medication, dry/curl/brush hair, and/or shave/remove hair.

SUMMARY

The present disclosure may be directed to a cabinet apparatus having a housing and a door. The housing may define a storage space having a front access opening. The door may include a first panel structure having a first sidewall panel having a first interior surface that partially defines the storage space and a first exterior surface. The door may also have a tubular flange extending lengthwise along the first sidewall panel and protruding from the first exterior surface. A first hinge component may be located on the tubular flange. The door may include a door body and a second hinge component on the door body. The first and second hinge components may be operably coupled to one another so that the door is pivotably mounted to the housing to be rotatable about a rotational axis between: (1) a closed position in which the door body encloses the front access opening; and (2) an open position in which the storage space is accessible via the front access opening.

BRIEF DESCRIPTION OF THE DRAWINGS

The present invention will become more fully understood from the detailed description and the accompanying drawings, wherein.

DETAILED DESCRIPTION

Figure 1:
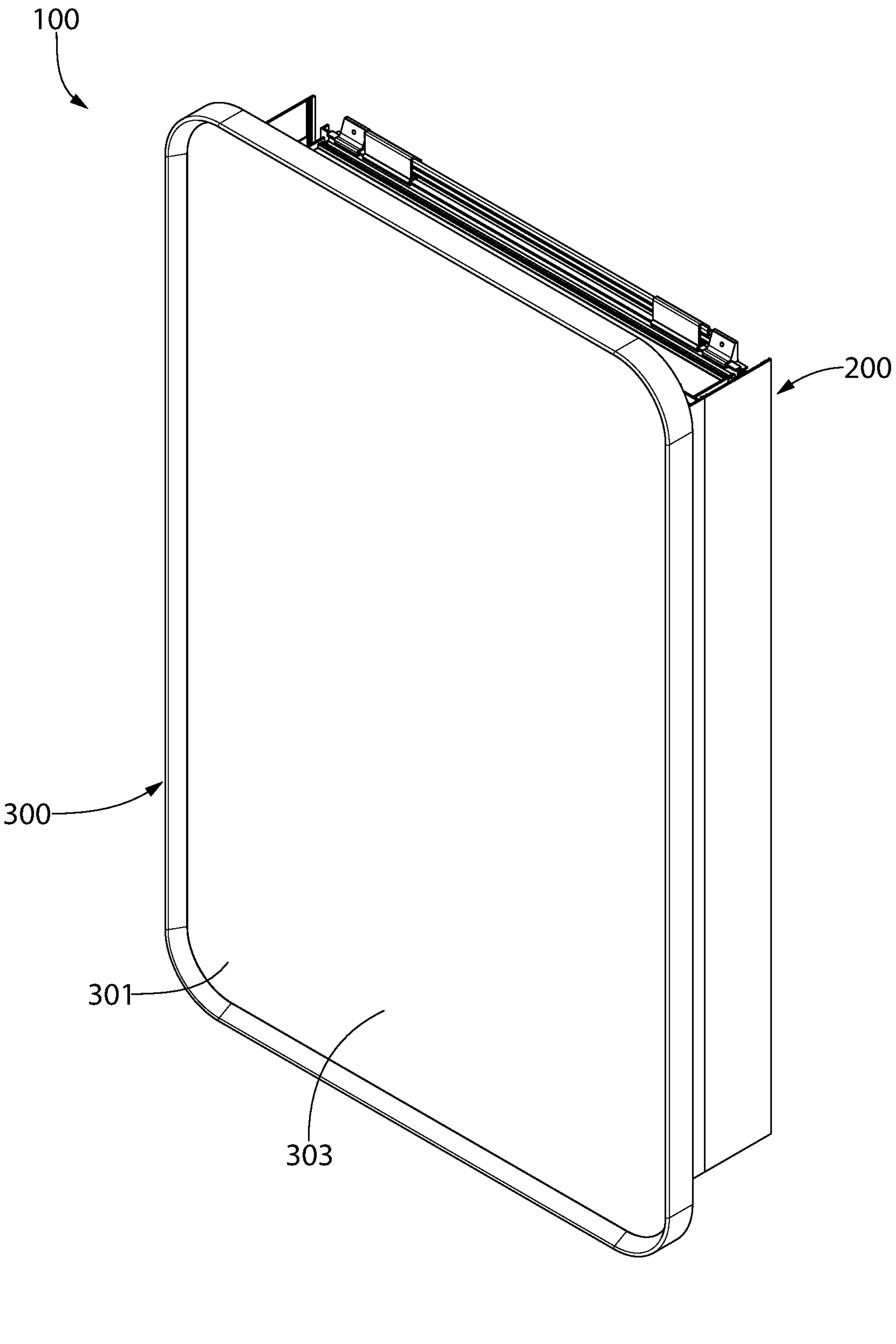
FIG. 1 is a front perspective view of an example cabinet assembly having a housing and a door with the door in a closed position.

The following description of the is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
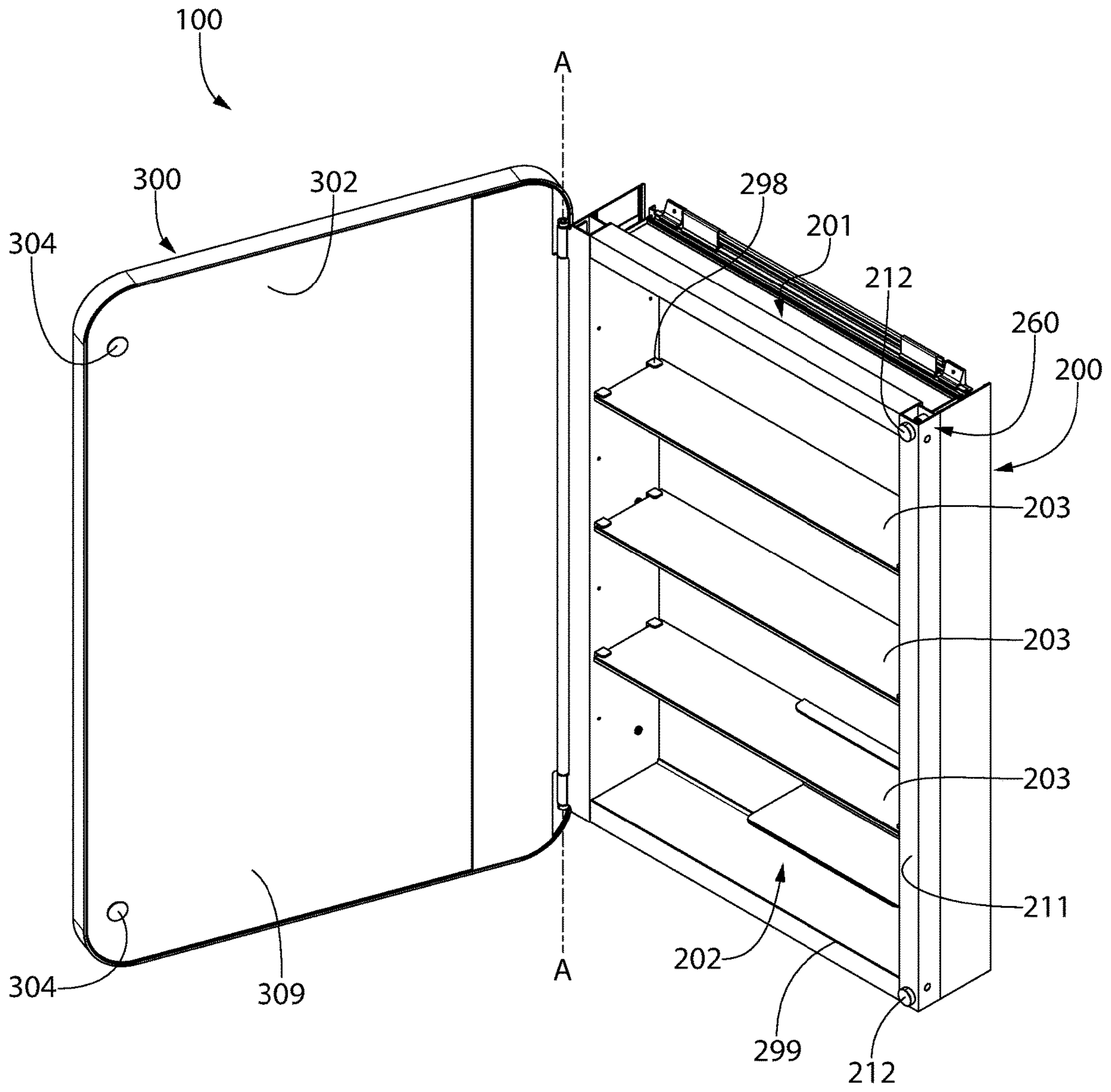
FIG. 2 is a front perspective view of an example cabinet assembly having a housing and a door with the door in a partially opened position.

Referring to FIGS. 1 and 2, a cabinet apparatus 100 will be described. The cabinet apparatus 100 generally includes a housing 200 and a door 300. The door 300 may be pivotably coupled to the housing 200 between a closed position as shown in FIG. 1 and an open position as shown in FIG. 2. The door 300 may be pivotably mounted to the housing 200 to be rotatable about a rotational axis A-A between the open and closed positions. The housing 200 may have a compartment body 201 that defines a storage space 202 and a flange 260 protruding outward from the compartment body 201. The storage space 202 may have a front access opening 299 which is an opening through which users may insert and remove items from the storage space 202. The flange 260 may circumscribe the front access opening 299.

The storage space 202 may be an interior cavity of the housing 200 within which a user may store various objects, such as for example without limitation medication, toothbrush, deodorant, hair care supplies, or really any other desired item. The cabinet apparatus 100 may include one or more shelves 203 located within the storage space 202 upon which a user may place any of the items that are stored within the storage space 202. The shelves 203 may be spaced apart from one another by varying distances which may be predetermined by a manufacturer or selectable by a consumer or end user. While there are three or four shelves 203 depicted in the drawings, there may be more or less than three or four shelves 203. The shelves 203 may be supported within the storage space 202 by clips 298 attached to interior surfaces of the compartment body 201.

The door 300 may have an exterior surface 301 and an interior surface 302. When the door 300 is in the closed position, the interior surface 302 may face the storage space 202 and the exterior surface 301 may face away from the storage space 202. The door 300 may close the front access opening 299 when in the closed state. The exterior surface 301 of the door 300 may be formed by or include a mirror 303 to allow a user to view themselves as is conventional for medicine style cabinets. Alternatively, the exterior surface 301 of the door 300 may not be mirrored, but may instead be a desirable color, texture, pattern, or the like to achieve a desired aesthetic for a particular space within which the cabinet apparatus 100 is to be hung. The interior surface 302 of the door 300 may also be formed by or include a mirror 309 to allow a user to view themselves when the door 300 is in the open position. Alternatively, the interior surface 302 may not be mirrored. The door 300 may be rectangular with rounded corners as shown, or may take on other shapes and sizes, including being rectangular or square with sharp or rounded corners, triangular, oval, circular, or other polygonal shapes with either sharp or rounded corners. The housing 200 may be rectangular regardless of the shape of the door 300. Alternatively, the housing 200 may also take on other shapes including circular, oval, square, or other polygonal shapes.

The housing 200 may have a front face 211 which surrounds the front access opening 299 and which is exposed when the door 300 is in the open position. The front face 211 of the housing 200 may be formed by a front surface of the flange 260. The housing 200 may have one or more magnetic elements 212 located on the front face 211. The one or more magnetic elements 212 may protrude from the front face 211. Alternatively, the one or more magnetic elements 212 may nest within a recess in the front face 211. The one or more magnetic elements 212 may include a magnetic member that is located within a silicone, rubber, foam, or other material which forms a housing that contains the one or more magnetic elements 212. Thus, the one or more magnetic elements 212 when housed within a silicone, rubber, foam, or other material may form a bumper element to prevent the door 300 from slamming against the housing 200 when being altered from the open position to the closed position. Alternatively, the magnetic elements 212 may be omitted.

The interior surface 302 of the door 300 may have one or more pockets 304, although such pockets 304 could be omitted. The door 300 may include magnet elements (not shown) located within the one or more pockets 304. The one or more pockets 304 may be aligned with the one or more magnetic elements 212 when the door 300 is in the closed state. As such, the one or more magnetic elements 212 of the housing 200 may nest within the one or more pockets 304 of the door 300 when the door 300 is in the closed position. The magnetic elements 212 of the housing 200 may magnetically attract to magnetic elements in the pockets 304 of the door 300 to secure the door 300 in the closed position.

Figure 3:
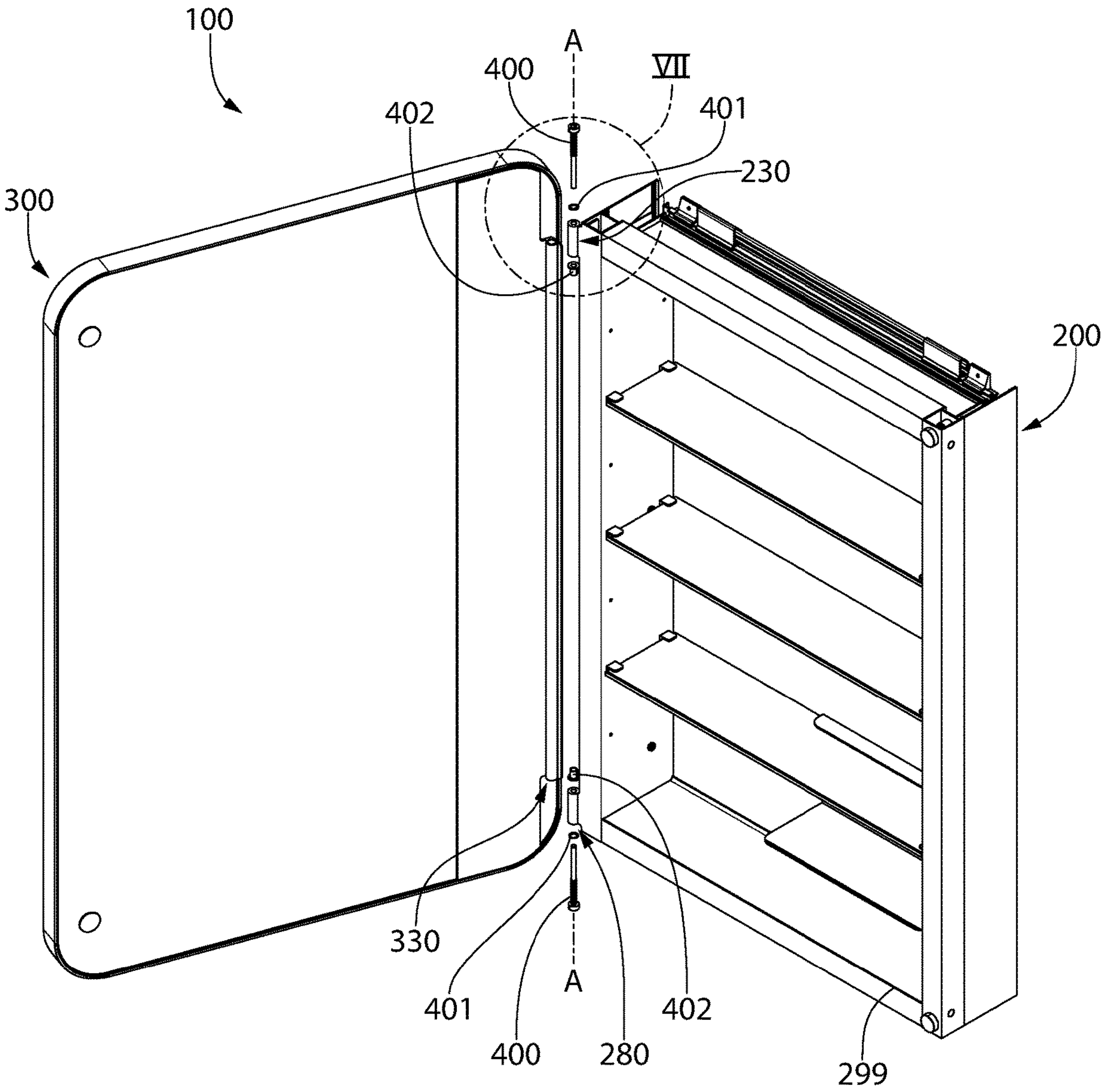
FIG. 3 is a partially exploded front perspective view of an example cabinet assembly having a housing and a door shown detached from one another

Referring to FIG. 3, the cabinet apparatus 100 is illustrated with the door 300 detached from the housing 200. The housing 200 may include a first hinge component 280. The door 300 may include a second hinge component 330. The first and second hinge components 280, 330 may be operably coupled together to enable the pivoting movement of the door 300 between the open and closed positions. The cabinet apparatus 100 may further include hardware components for facilitating the attachment between the first and second hinge components 280, 330. The hardware components may include one or more hinge pins 400, one or more washers 401, and one or more connector members 402 that facilitate the attachment between the first and second hinge components 280, 330 while permitting the door 300 to rotate/pivot relative to the housing 200. The first and second hinge components 280, 330 may be operably coupled to one another so that the door 300 is pivotably mounted to the housing 200 to be rotatable about the rotational axis A-A between: (1) the closed position in which the door 300 closes the front access opening 299 of the storage space 202, as shown in FIG. 1; and (2) the open position in which the storage space is accessible via the front access opening 299, as shown in FIG. 2.

Figure 4A:
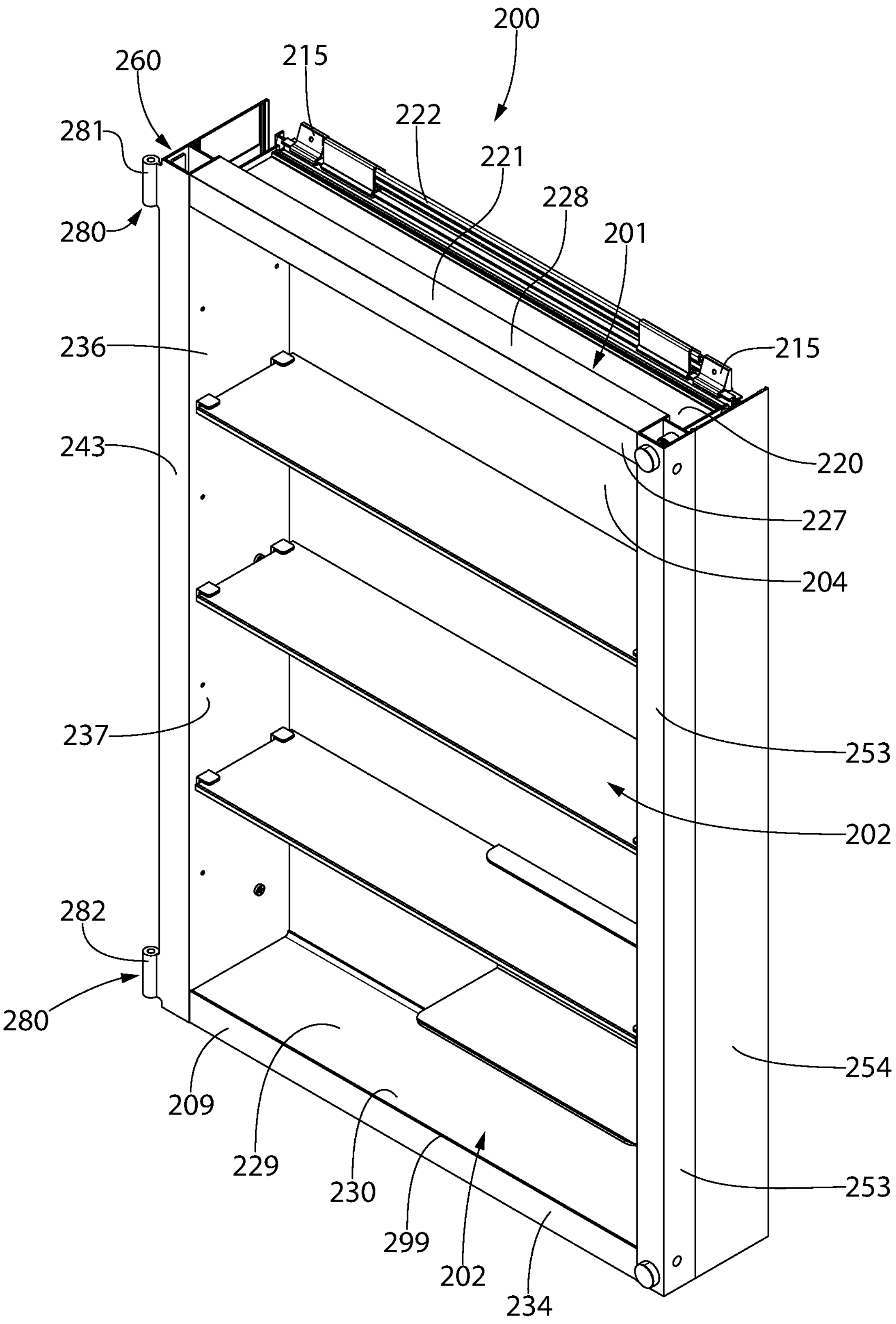
FIG. 4A is a front perspective view of an example housing of a cabinet apparatus.
Figure 4B:
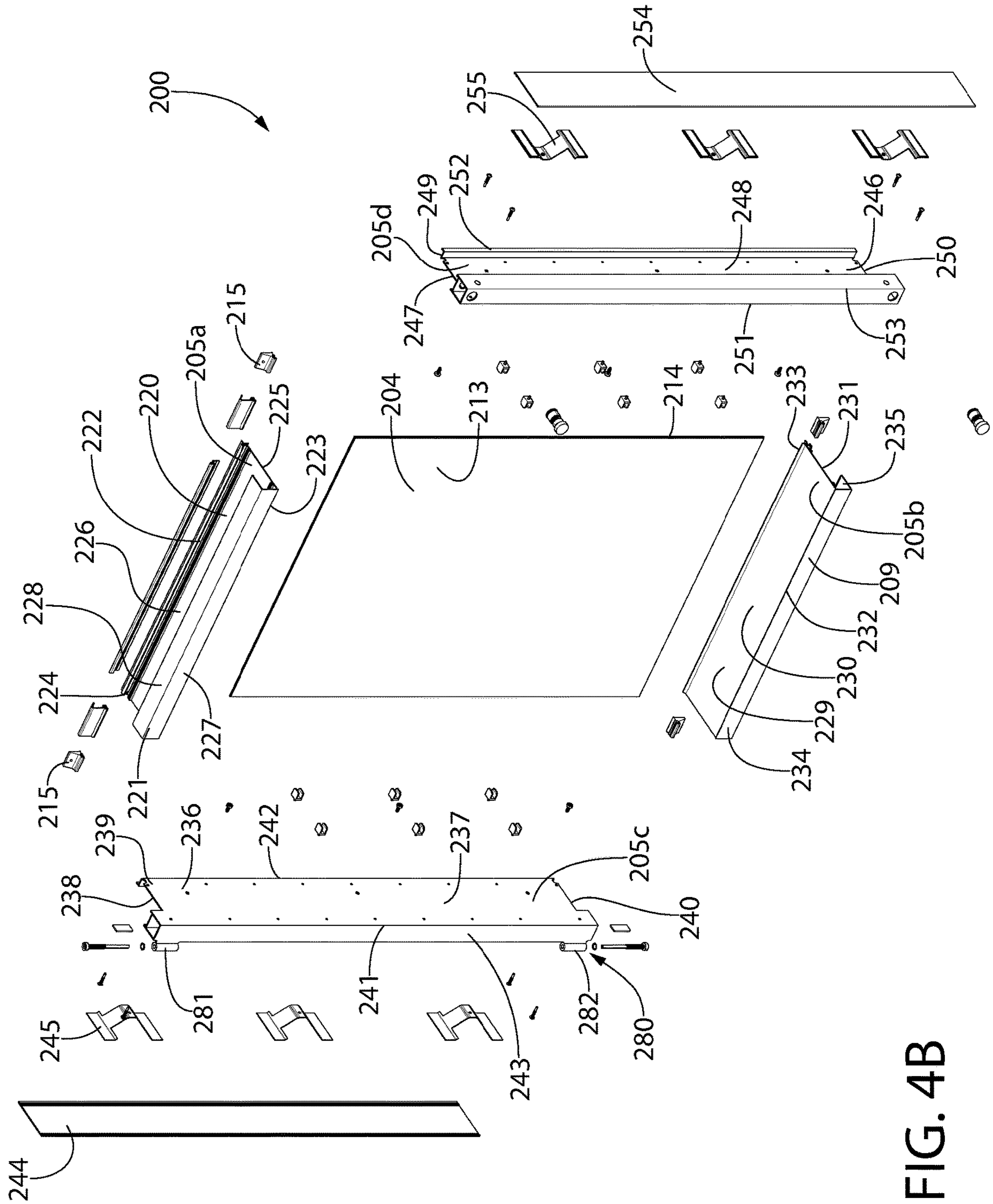
FIG. 4B is an exploded front perspective view of an example housing of a cabinet apparatus.

Referring to FIGS. 4A and 4B, the housing 200 will be described in greater detail. The housing 200 may have a rear panel 204 and a plurality of panel structures 205*a-d* that may be connected to and extend from the rear panel 204 to define the storage space 202. The rear panel 204 may be a flat panel structure having a flat interior surface 213 and a flat exterior surface 214. Alternatively, the interior and/or exterior surfaces 213, 214 of the rear panel 204 may have some contour rather than being entirely flat and planar. The interior surface 213 of the rear panel 204 may face and define a rearmost boundary of the storage space 202.

The panel structures 205*a-d* may include a top panel structure 205*a*, a bottom panel structure 205*b*, a left panel structure 205*c*, and a right panel structure 205*d*. Each of the panel structures 205*a-d* may be coupled to the rear panel 204 to form the housing 200 and to define the storage space 202. Various clips, fasteners, screws, brackets, and the like may be used to facilitate the attachment of the panel structures 205*a-d* to the rear panel 204. Each of the panel structures 205*a-d* may extend from the interior surface 213 of the rear panel 204 to collectively define the storage space 202. As discussed below, the compartment body 201 may include the rear panel 204 and parts of each of the panel structures 205*a-d*, while other parts of the panel structures 205*a-d* may form the flange 260.

The top panel structure 205*a* may include a top panel 220 that forms an upper boundary of the storage space 202, a top flange portion 221, and a hanging bracket 222. The top panel 220 may have a front edge 223, a rear edge 224, an interior surface 225, and an exterior surface 226. The top panel 220 may be a flat panel structure such that the interior and exterior surfaces 225, 226 are planar. The top flange portion 221 may extend upwardly from the exterior surface 226 of the top panel 220 along the front edge 223 of the top panel 220. The top flange portion 221 may be L-shaped, such that it may include a vertical wall portion 227 that extends upwardly from the exterior surface 226 of the top panel 220 and a horizontal wall portion 228 that extends horizontally and rearwardly from a distal end of the vertical wall portion 227 in a direction towards the rear edge 224 and towards the rear panel 204. Thus, the top flange portion 221 may form an open channel. In an alternative embodiment, the top flange portion 221 may include another vertical wall extending from the distal end of the horizontal wall portion 228 to the exterior surface 231 of the top panel 220. The top panel structure 205*a* may be formed as a single monolithic component via an extrusion process.

The hanging bracket 222 may extend upwardly from the exterior surface 224 of the top panel 220 along the rear edge 224 of the top panel 222. The hanging bracket 222 may be used when the cabinet apparatus 100 is flush-mounted to a wall, whereas the hanging bracket 222 may not be used when the cabinet apparatus 100 is recess mounted to a wall. When the cabinet apparatus 100 is flush-mounted to a wall, cleats or the like may be mounted to the wall and then the hanging bracket 222 may engage the cleats to hang or mount the cabinet apparatus 100 to the wall. The cabinet apparatus 100 may also include separate brackets 215 with apertures for further securing the cabinet apparatus 100 to the wall when flush mounted as described herein. The hanging bracket 213 may extend upwardly from the top boundary wall 220 and may be located adjacent to a rear edge of the top panel structure 205*a* which is adjacent to the rear panel 204. The hanging bracket 213 may extend along the full length of the top panel structure 205*a*, although alternatively it may extend along a portion of the length of the top panel structure 205*a*.

The bottom panel structure 205*b* may include a bottom panel 229 having an interior surface 230, an exterior surface 231, a front edge 232, and a rear edge 233. The bottom panel 229 may be a flat panel structure such that the interior and exterior surfaces 230, 231 are planar. The bottom panel 229 may form a lower boundary of the storage space 202. In particular, the interior surface 230 of the bottom panel 229 may form the lower boundary of the storage space 202. The bottom panel structure 205*b* may further comprise a bottom flange portion 209. The bottom flange portion 209 may be located along the front edge 232 of the bottom panel 229. In particular, the bottom flange portion 209 may be L-shaped such that it may include a vertical wall portion 234 that extends downwardly from the exterior surface 230 of the bottom panel 229 along the front edge 232 and a horizontal wall portion 235 that extends rearwardly from the distal end of the vertical wall portion 234 in a direction towards the rear edge 233 of the bottom panel 229 and towards the rear panel 204. Thus, the bottom flange portion 209 may form an open channel. In an alternative embodiment, the bottom flange portion 209 may include another vertical wall extending from the distal end of the horizontal wall portion 235 to the exterior surface 231 of the bottom panel 229. The bottom panel structure 205*b* may be formed as an integral monolithic component via an extrusion process.

The left panel structure 205*c* (which may be referred to in the specification and/or claims as a first panel structure) includes a first sidewall panel 236 having an interior surface 237 and an exterior surface 238. The first sidewall panel 236 may extend lengthwise and be elongated between a top edge 239 and a bottom edge 240. The first sidewall panel 236 may have a front edge 241 and a rear edge 242. The interior and exterior surfaces 237, 238 of the first sidewall panel 236 may be generally planar. The interior surface 237 of the left sidewall panel 236 may define or bound a left side of the storage space 202. The left panel structure 205*c* may further include a left flange portion 243. The left flange portion 243 may be a tubular flange extending lengthwise along the first sidewall panel 236 from the top edge 239 to the bottom edge 240. The left flange portion 243 may be located adjacent to the front edge 241 of the first sidewall panel 236. The left flange portion 243 may protrude from the exterior surface 238 of the first sidewall panel 236 adjacent to the front edge 241 of the first sidewall panel 236.

The left flange portion 243 is described herein as being tubular, but this does not limit the left flange portion 243 to being any particular shape. In the example shown, the left flange portion 243 is square or rectangular and tubular, meaning it defines a hollow interior. However, alternatively the left flange portion 243 may take on other shapes, such as being circular, triangular, or other polygonal shapes. The structural details of the left flange portion 243 will be described in greater detail below with reference to FIGS. 5A and 5B.

The left panel structure 205*c* may further include the first hinge component 280. The first hinge component 280 may be located on the left flange portion (or tubular flange) 243 of the left panel structure 205*c*. The first hinge component 280 may include an upper first hinge knuckle 281 protruding from a front-outside corner of the left flange portion 243 adjacent to the top edge 239 of the first sidewall panel 236 and a lower first hinge knuckle 282 protruding from the front-outside corner of the left flange portion 243 adjacent to the bottom edge 240 of the first sidewall panel 236. Thus, the first hinge component 280 may include a pair of the first hinge knuckles 281, 282 (including the upper and lower first hinge knuckles) that are spaced apart along the length of the left flange portion 243 of the left panel structure 205*c*. Alternatively, a single first hinge knuckle or more than two first hinge knuckles could be used. Additional details about the first hinge knuckles 281, 282 may be provided below with reference to FIGS. 5A and 5B.

The left panel structure 205*c* may be a singular monolithic component which includes the first sidewall panel 236, the left flange portion 243, and the first hinge knuckles 231, 231 as integral parts of a singular component. The left panel structure 205*c* may be formed via an extrusion process.

As noted above, the left flange portion 243 is tubular, meaning it is not just an L-shaped flange, but rather is a fully enclosed flange with a square or rectangular transverse cross-sectional area. Thus, the left flange portion 243 is more robust and rigid than if it were just an L-shaped flange. This added robustness by forming the left flange portion 243 with a tubular shape enables the first hinge component 280 to be located on the left flange portion 243 and to be formed integrally with the left flange portion 243. Thus, rather than having to affix a separate metal or plastic hinge to the housing 200, the hinge (or the first hinge component 280 there) is able to be formed integrally with the left panel structure 205*c*.

The housing 200 may also include a first cover member 244 that is configured to be detachably coupled to the left panel structure 205*c* to at least partially cover the exterior surface 238 of the first sidewall panel 236. The first cover member 244 may cover portions of the exterior surface 238 of the first sidewall panel 236 that would otherwise be exposed. In particular, the first cover member 244 may cover portions of the exterior surface 238 of the first sidewall panel 236 from which the left flange portion 243 does not protrude. When coupled to the left panel structure 205*c*, the first cover member 244 may sit flush with an exterior surface of the left flange portion 243 to create a seamless exterior appearance. The first cover member 244 may be used when the cabinet apparatus 100 is flush mounted to a wall, but the first cover member 244 may be omitted when the cabinet apparatus 100 is recess mounted to a wall. The housing 200 may include one or more bracket members 245 to facilitate the coupling of the cover member 244 to the left panel structure 205*c*. The one or more bracket members 245 may be coupled to the first sidewall panel 236 with fasteners such as screws, and then coupled to the first cover member 244 via mechanical interaction of the parts (sliding engagement, mating, snap-fit, friction fit, or the like). Alternatively, the one or more bracket members 245 may also be coupled to the first cover member 244 with screws or fasteners of other types.

The right panel structure 205*d* is essentially identical to the left panel structure 205*c*, except the right panel structure 205*d* may not include the hinge component. Alternatively, the right panel structure 205*d* could include the hinge component 280 while the left panel structure 205*c* does not include the hinge component 280. This may be dependent on the direction upon which the door 300 is intended to pivot between the open/closed positions.

The right panel structure 205*d* (which may be referred to in the specification and/or claims as a second panel structure) includes a second sidewall panel 246 having an interior surface 247 and an exterior surface 248. The second sidewall panel 246 may extend lengthwise and be elongated between a top edge 249 and a bottom edge 250. The second sidewall panel 246 may have a front edge 251 and a rear edge 252. The interior and exterior surfaces 247, 248 of the second sidewall panel 246 may be generally planar. The interior surface 247 of the second sidewall panel 246 may define or bound a right side of the storage space 202. The second panel structure 205*d* may further include a right flange portion 253. The right flange portion 253 may be a tubular flange extending lengthwise along the second sidewall panel 246 from the top edge 249 to the bottom edge 250. The right flange portion 253 may be located adjacent to the front edge 251 of the second sidewall panel 246. The right flange portion 253 may protrude from the exterior surface 248 of the second sidewall panel 246 adjacent to the front edge 251 of the second sidewall panel 246.

The right flange portion 253 is described herein as being tubular, but this does not limit the right flange portion 253 to being any particular shape. In the example shown, the right flange portion 253 is square or rectangular and tubular, meaning it defines a hollow interior. However, alternatively the right flange portion 253 may take on other shapes, such as being circular, triangular, or other polygonal shapes. The structural details of the right flange portion 253 may be identical to the left flange portion 243, and thus the description of the left flange portion 243 below with reference to FIGS. 5A and 5B may be entirely applicable to the right flange portion 253.

The right panel structure 205*d* may be a singular monolithic component which includes the second sidewall panel 246 and the right flange portion 253. The right panel structure 205*d* may be formed via an extrusion process.

The housing 200 may also include a second cover member 254 that is configured to be detachably coupled to the right panel structure 205*d* to at least partially cover the exterior surface 248 of the second sidewall panel 246. The second cover member 254 may cover portions of the exterior surface 248 of the second sidewall panel 246 that would otherwise be exposed. In particular, the second cover member 244 may cover portions of the exterior surface 248 of the second sidewall panel 246 from which the right flange portion 253 does not protrude. When coupled to the right panel structure 205*d*, the second cover member 254 may sit flush with an exterior surface of the right flange portion 253 to create a seamless exterior appearance. The second cover member 254 may be used when the cabinet apparatus 100 is flush mounted to a wall, but the second cover member 254 may be omitted when the cabinet apparatus 100 is recess mounted to a wall. The housing 200 may include one or more bracket members 255 to facilitate the coupling of the second cover member 254 to the right panel structure 205*d*. The one or more bracket members 255 may be coupled to the second sidewall panel 246 with fasteners such as screws, and then coupled to the second cover member 254 via mechanical interaction of the parts (sliding engagement, mating, snap-fit, friction fit, or the like). Alternatively, the one or more bracket members 255 may also be coupled to the second cover member 254 with screws.

Various additional hardware components such as brackets, fasteners, screws, clips, and the like are shown in FIG. 4B and may be used to couple the various components described above together and/or to facilitate the mounting of the assembled cabinet apparatus 100 to a wall. These hardware components are generally self-explanatory and a detailed discussion thereof is not provided here.

In accordance with the disclosure set forth herein, the top panel 220, the bottom panel 229, the first sidewall panel 236, and the second sidewall panel 246 collectively form the compartment body 201 of the housing 200, which defines the storage space 202. That is, the interior surfaces 225, 230, 237, 247 of the top, bottom, first sidewall, and second sidewall panels 220, 229, 236, 246 may collectively form the boundary of the storage space 202. Furthermore, the top flange portion 227, the bottom flange portion 209, the left flange portion 243, and the right flange portion 253 may collectively form the flange 260 of the housing 200. The left and right flange portions 243, 254 may be tubular structures and the top and bottom flange portions 227, 209 may be open channel structures (such as formed by the L-shape as described above). As discussed further below, the flange 260 is configured to abut against a surface of a wall when the cabinet apparatus 100 is recess-mounted into the wall. That is, the flange 260 provides a contact surface which will abut against the wall to ensure that the cabinet apparatus 100 is recessed a proper distance into the wall when recess-mounted. The flange 260 may surround the front access opening 299 of the housing 200.

Figure 5A:
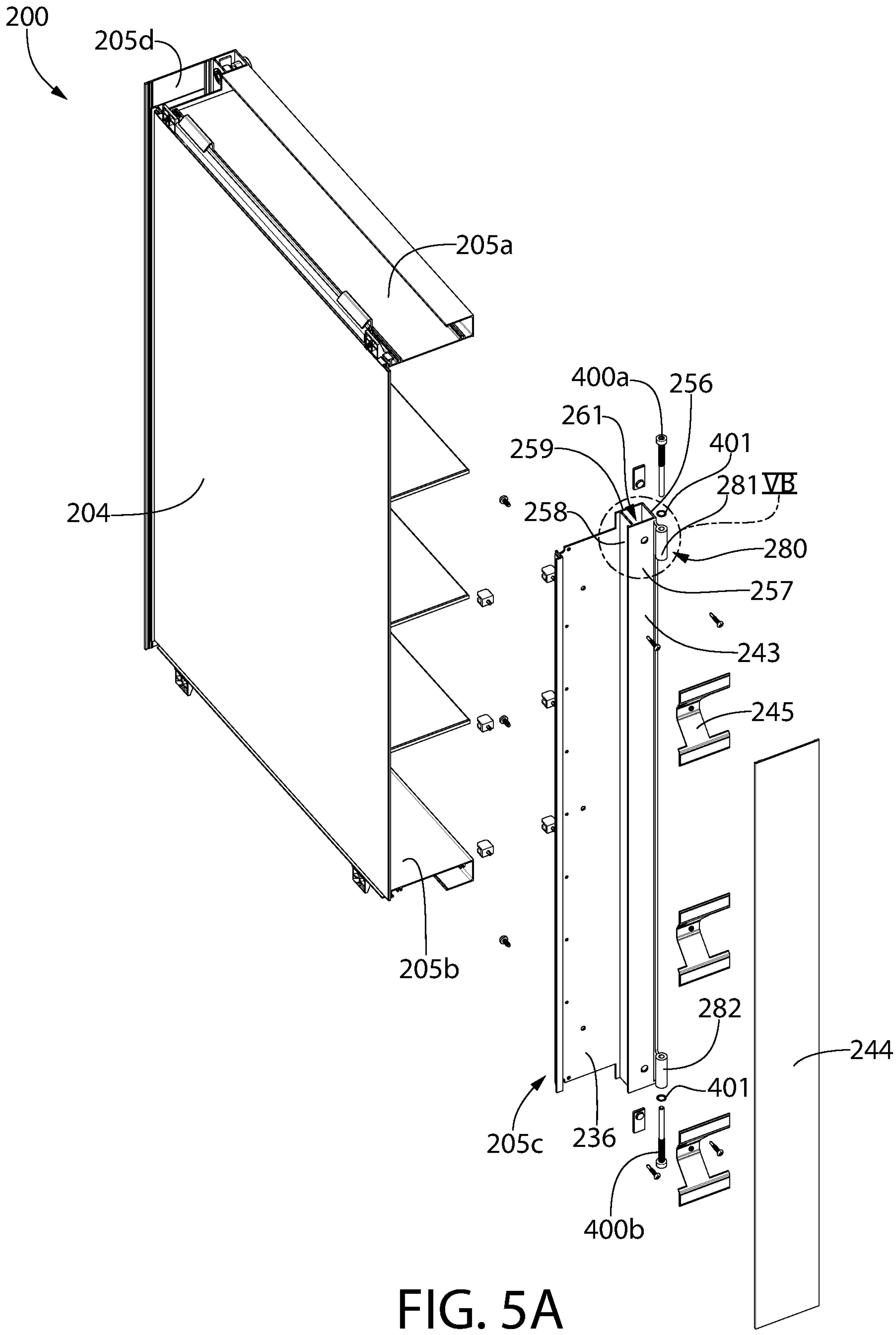
FIG. 5A is a partially exploded rear perspective view of an example cabinet assembly.
Figure 5B:
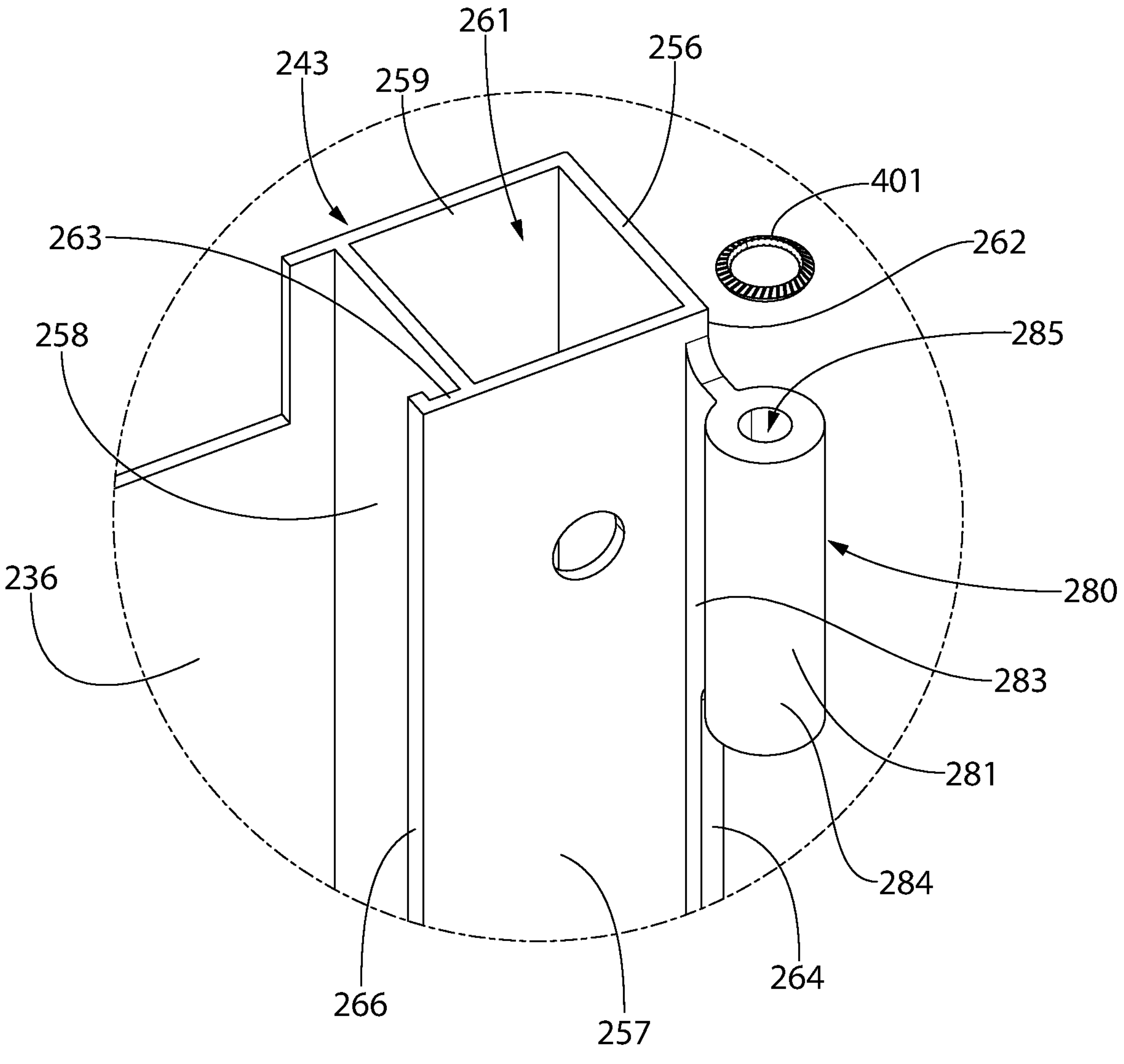
FIG. 5B is a close-up view of area VB of FIG. 5A.

Referring to FIGS. 5A and 5B, the left (or first) panel structure 205*c*, and more specifically the left flange portion 243 and first hinge component 280 thereof, will be further described. The left flange portion (or tubular flange) 243 may include a front wall 256, an outer wall 257, a rear wall 258, and an inner wall 259 that collectively define a tubular cavity 261. The tubular cavity 261 may have a rectangular or square transverse cross-sectional profile. In alternative embodiments, the tubular cavity 261 may have a differently shaped cross-sectional profile, such as being other polygonal shapes or circular. The first sidewall panel 236 may have a front portion which forms the inner wall 259 of the left flange portion 243. That is, the first sidewall panel 236 may be flush and seamless with the inner wall 259 of the left flange portion 243 because in essence the first sidewall panel 236 forms the inner wall 259. The front and rear walls 256, 258 may extend perpendicularly from the inner wall 259 in the same direction, and the outer wall 257 may extend between the opposing ends of the front and rear walls 256, 258 relative to the inner wall 259 so that the outer wall 257 may be parallel to the inner wall 259. The front wall 256 may form a portion of the front face 211 of the housing 200 when the housing 200 is assembled. The left flange portion or tubular flange 243 has a front-outside corner 262 at the intersection of the front wall 256 and the outer wall 257. As used herein, the front-outside corner 262 may include the edge where the front and outer walls 256, 257 intersect as well as a small portion of the front and outer walls 256, 257 which is immediately adjacent to the intersection edge. The first hinge component 280 may be located at and protrude from the front-outside corner 262 of the left flange portion 243. More specifically, the first hinge component 280 may protrude from the outer wall 257 at a position that is immediately adjacent to location at which the front and outer walls 256, 257 intersect (i.e., the first hinge component 280 may protrude from the outer wall 257 at a position that is adjacent to the front wall 256).

The outer wall 257 may extend rearwardly beyond the rear wall 258 such that the portion of the outer wall 257 that extends beyond the rear wall 258 forms an abutment lip 263. The abutment lip 263 may protrude from an exterior surface of the rear wall 258 which faces away from the tubular cavity 261. The abutment lip 263 may abut against a wall surface when the cabinet apparatus 100 is recess-mounted into the wall, as described further below. Alternatively, the abutment lip 263 could be omitted and in such alternatives examples the exterior surface of the rear wall 258 may abut against the wall surface when the cabinet apparatus 100 is recess-mounted into the wall.

The abutment lip 263 terminates in a distal end 266 which is the end that is configured to abut against the wall when the cabinet apparatus 100 is recess-mounted into a wall. The distal end 266 may have an increased thickness relative to a remainder of the abutment lip 263 to enhance the contact surface area between the abutment lip 263 and the wall. Although not shown in these figures, when the cover member 244 is coupled to the left panel structure 205*c*, one of the edges of the cover member 244 abuts directly against the distal end 266 of the abutment lip 263. Furthermore, the front surface of the cover member 244 is flush with the exterior surface of the outer wall 257. This is shown, for example, in FIG. 4A with reference to the second cover member 254 and its interaction with the right flange portion 253 of the second sidewall panel 246. That is, the flush interaction between the second cover member 254 and the right flange portion 253 is shown in FIG. 4A, and the same flush interaction may be formed between the first cover member 244 and the left flange portion 243.

The first hinge component 280 may include the upper first hinge knuckle 281 and the lower first hinge knuckle 282. The upper first hinge knuckle 281 will be described here, and it should be understood that the lower first hinge knuckle 282 is identical to the upper first hinge knuckle 282 and thus the description of the upper first hinge knuckle 281 is entirely applicable to the lower first hinge knuckle 282. Furthermore, in alternative examples there may be just one first hinge knuckle rather than an upper one and a lower one that are spaced apart.=

The first hinge component 280 may include a first rib 283 protruding from the left flange portion 243. The first rib 283 may protrude from the left flange portion 243, and more specifically from the outer wall 257 thereof, at or adjacent to the front-outside corner 262 as described above. The upper first hinge knuckle 281 may be attached to and extend or protrude from a distal end of the first rib 283 which is spaced from the left flange portion 243. The upper first hinge knuckle 281 may include a cylindrical body portion 284 that defines a hollow interior 285 extending vertically through the cylindrical body portion 284.

A stop lip 264 may protrude from an exterior surface of the outer wall 257 of the left flange portion 243. The stop lip 264 may extend the full length between the upper and lower first hinge knuckles 281, 282. Alternatively, the stop lip 264 may extend intermittently or only part of the way between the upper and lower first hinge knuckles 281, 282. The stop lip 264 may be formed by at least a portion of the front wall 256 extending beyond the exterior surface of the outer wall 257. Alternatively, the stop lip 264 may be a separate tab feature that protrudes from the exterior surface of the outer wall 257 at a location adjacent to the front-outside corner 262. An exterior surface of the stop lip 264 may be flush with an exterior surface of the front wall 256.

As previously described, the cabinet apparatus 100 may include one or more hinge pins 400, one or more washers 401, and one or more connector members 402 that facilitate the pivoting/rotating attachment between the first and second hinge components 280, 330. More specifically, the one or more hinge pins 400 may include a first hinge pin 400*a* that may be used to pivotably couple the upper first hinge knuckle 281 to the second hinge component 330 of the door 300 and a second hinge pin 400*b* that may be used to pivotably couple the lower first hinge knuckle 282 to the second hinge component 330 of the door 300. There may be a washer 401 and/or a connector member 402 associated with each of the hinge pins 400*a*, 400*b*.

Figure 6:
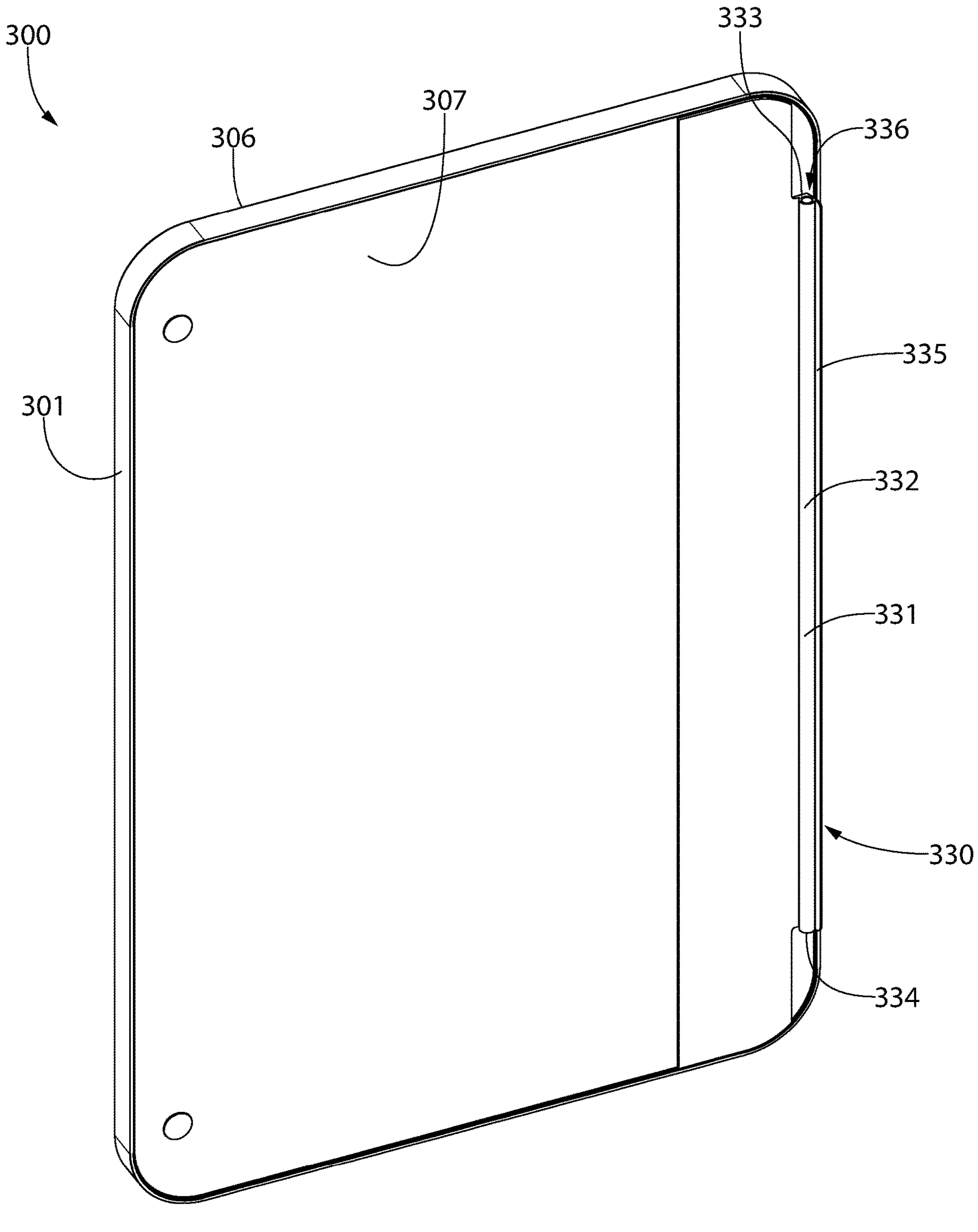
FIG. 6 is a front perspective view of an example door of a cabinet apparatus.

Referring to FIG. 6, the door 300 will be described. The door 300 may include a door body 305 having an exterior surface (or front surface) 306 and an interior surface (or rear surface) 307. The exterior surface 306 may form the exterior surface 301 of the door 300 and the interior surface 307 may form the interior surface 302 of the door 300. Alternatively, a mirror may be affixed to one or both of the exterior and interior surfaces 306, 307 of the door body 305 such that the mirror may form the exterior and interior surfaces 301, 302 of the door 300. The second hinge component 330 may be located on the door body 301. The second hinge component 330 may comprise a second hinge knuckle 331 that protrudes from the interior surface 307 of the door body 305 of the door body 305. The second hinge knuckle 331 may be located adjacent to an edge of the door body 305 which is located adjacent to the housing 200 when the door 300 is coupled to the housing 200 to form the cabinet apparatus 100.

The second hinge knuckle 331 may include a cylindrical body 332 that is elongated between a top end 333 and a bottom end 334. The cylindrical body 332 may define a hollow interior 336, or may be hollow along top and bottom portions thereof. The second hinge component 330 may also include a hinge stop 335. The hinge stop 330 may be a tab feature that protrudes from an exterior surface of the cylindrical body 332 of the second hinge knuckle 331. The hinge stop 335 may extend along the full length of the cylindrical body 332, or along only a portion of the length of the cylindrical body 332. The hinge stop 335 may protrude from the cylindrical body 332 in a direction that is generally perpendicular to the interior surface 307 of the door body 305 and at a position along the cylindrical body 332 which is closest to the edge of the door body 305 that the cylindrical body 332 is positioned nearest to. While the hinge stop 335 is shown and described as being formed as part of the second hinge component 330, in other embodiments the hinge stop 335 maybe formed as part of the first hinge component 280 of the housing 200.

Figure 7:
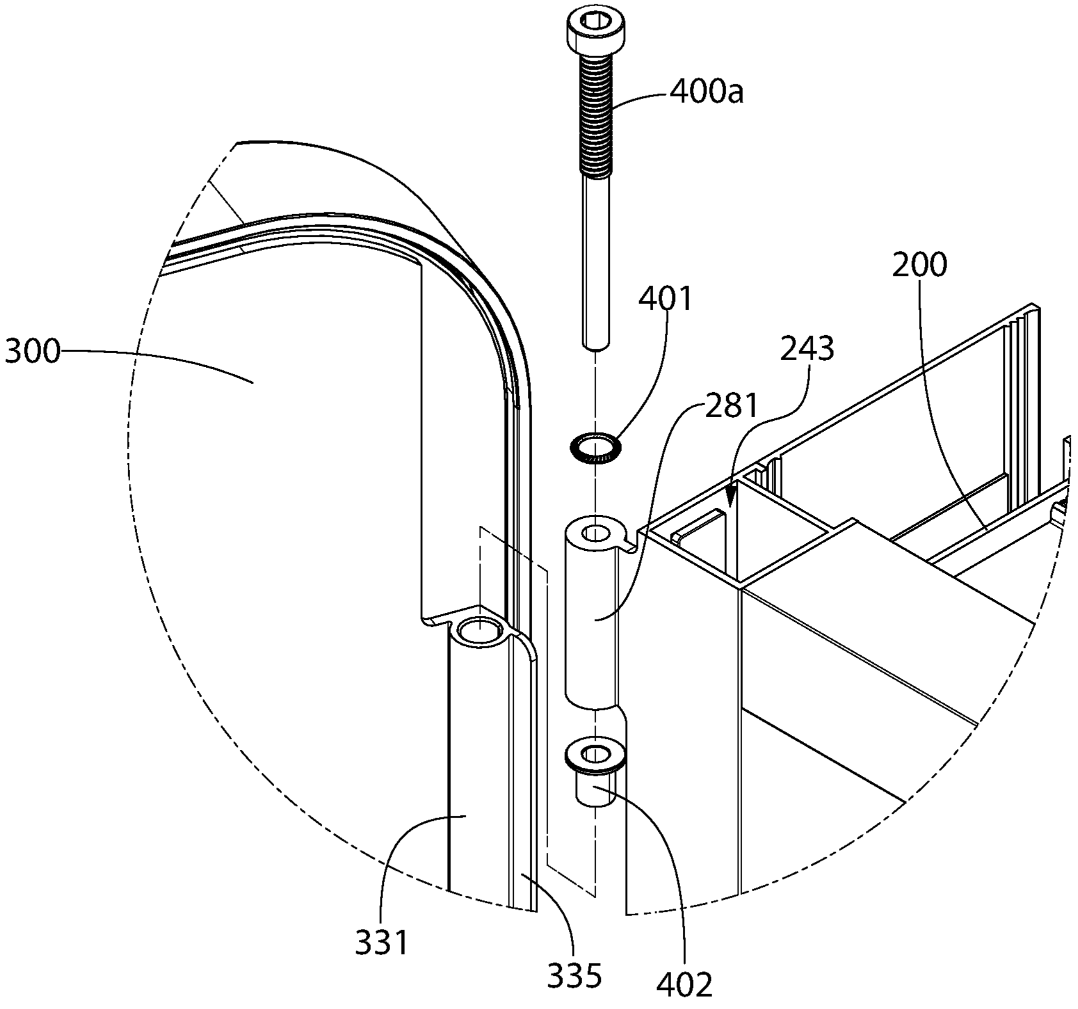
FIG. 7 is an exemplary close-up view of area VII of FIG. 3.

Referring to FIG. 7, the coupling of the first and second hinge components 280, 330 will be described. The second hinge knuckle 331 of the second hinge component 330 of the door 300 may be positioned between the upper and lower first hinge knuckles 281, 282 of the first hinge component 280 of the housing 200. Then, the first hinge pin 400*a* may be inserted through the passageways in the upper hinge knuckle 281 and the second hinge knuckle 331 and the second hinge pin 400*b* may be inserted through the passageways in the lower hinge knuckle 282 and the second hinge knuckle 331. The washer element 401 and connector members 402 may further assist with the connection of the first and second hinge components 280, 330 will permitting the pivoting movement as described herein. Once the elements described here are assembled, the door 300 is pivotably coupled to the housing 200 and may be rotated or pivoted between the open and closed positions.

Figure 8:
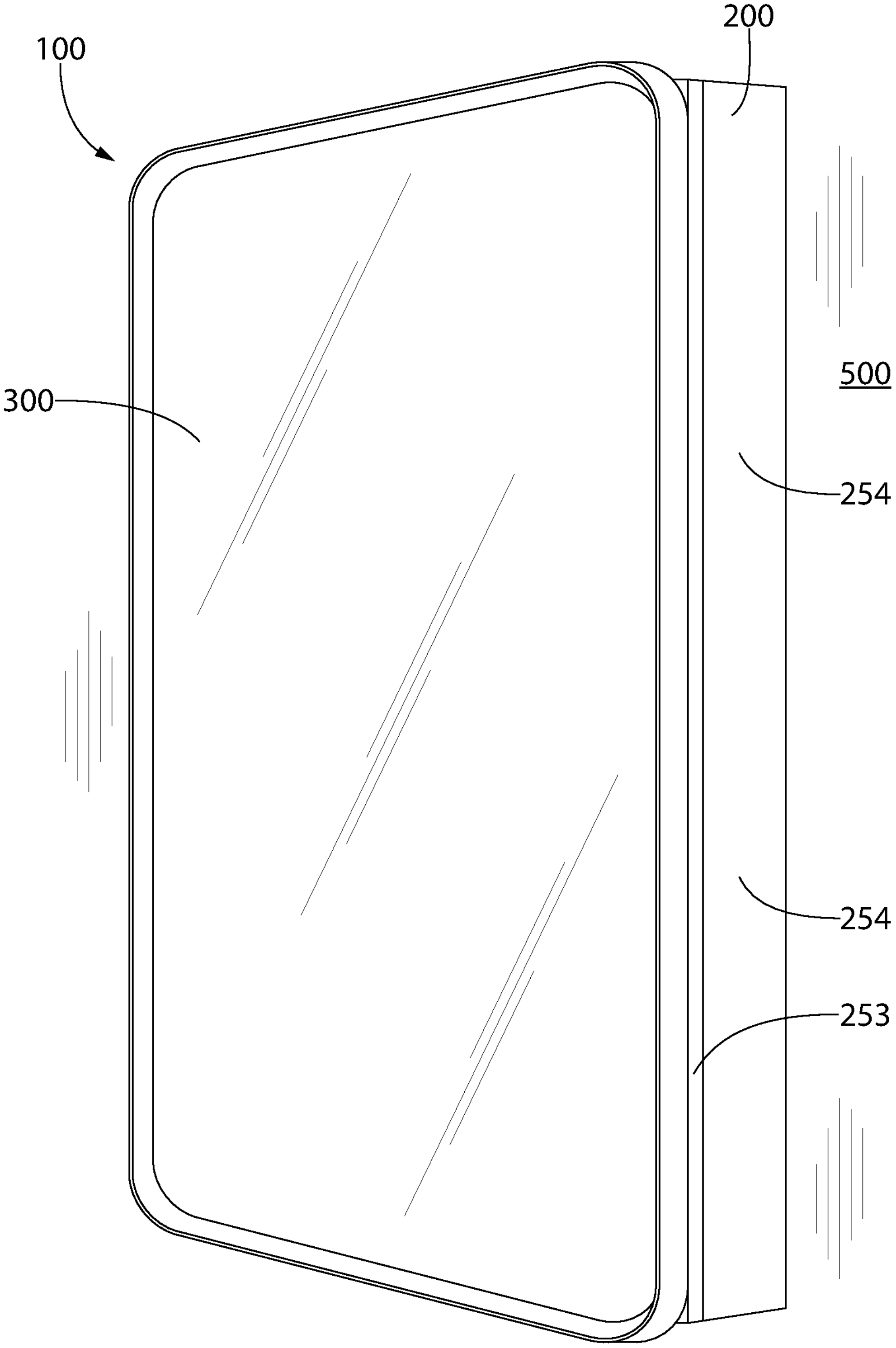
FIG. 8 is a front perspective view of an exemplary cabinet apparatus shown flush mounted to a wall.

FIG. 8 illustrates the cabinet apparatus 100 being flush-mounted to a wall 500. When the cabinet apparatus 100 is flush-mounted to the wall 500, the first and second cover members 244, 254 are attached to the left and right panel structures 205*c*, 205*d* to provide the cabinet apparatus 100 with a clean aesthetic. As mentioned above, the second cover member 254 is shown flush with the outer wall of the right flange portion 253. The cabinet apparatus 100 may be flush-mounted to the wall 500 using cleats, hanging hardware, screws, fasteners, mounting brackets, or the like.

Figure 9:
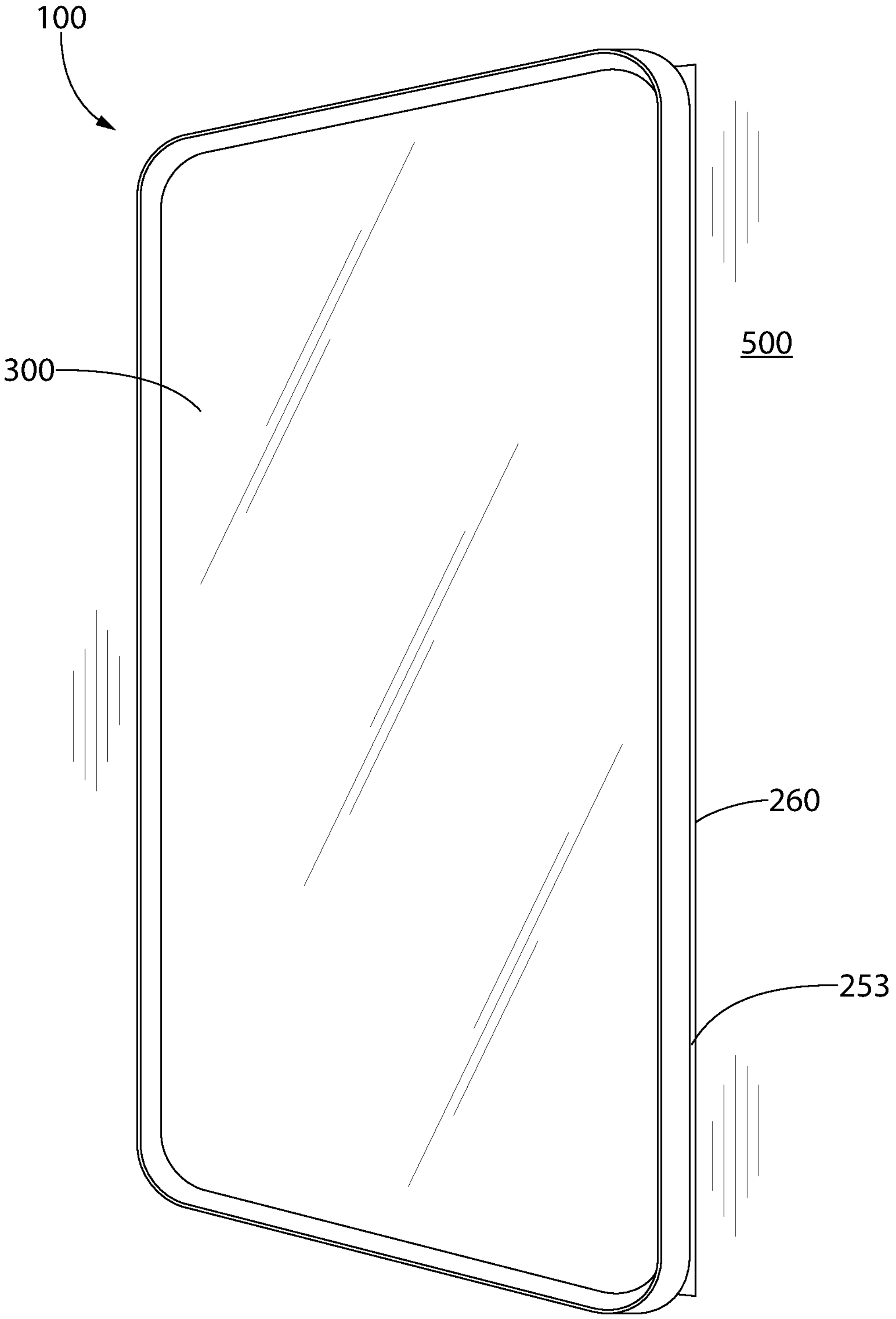
FIG. 9 is a front perspective view of an exemplary cabinet apparatus shown recess mounted to a wall.

FIG. 9 illustrates the cabinet apparatus 100 being recess-mounted to the wall 500. When the cabinet apparatus 100 is recess-mounted to the wall 500, a majority of the housing 200 is located within a hole formed into the wall 500 and a portion of the housing 200 and the door 300 are located outside of the hole in the wall 500. In particular, the flange 260 abuts the outer surface of the wall 500 when the cabinet apparatus 100 is recess-mounted into the wall.

Figure 10:
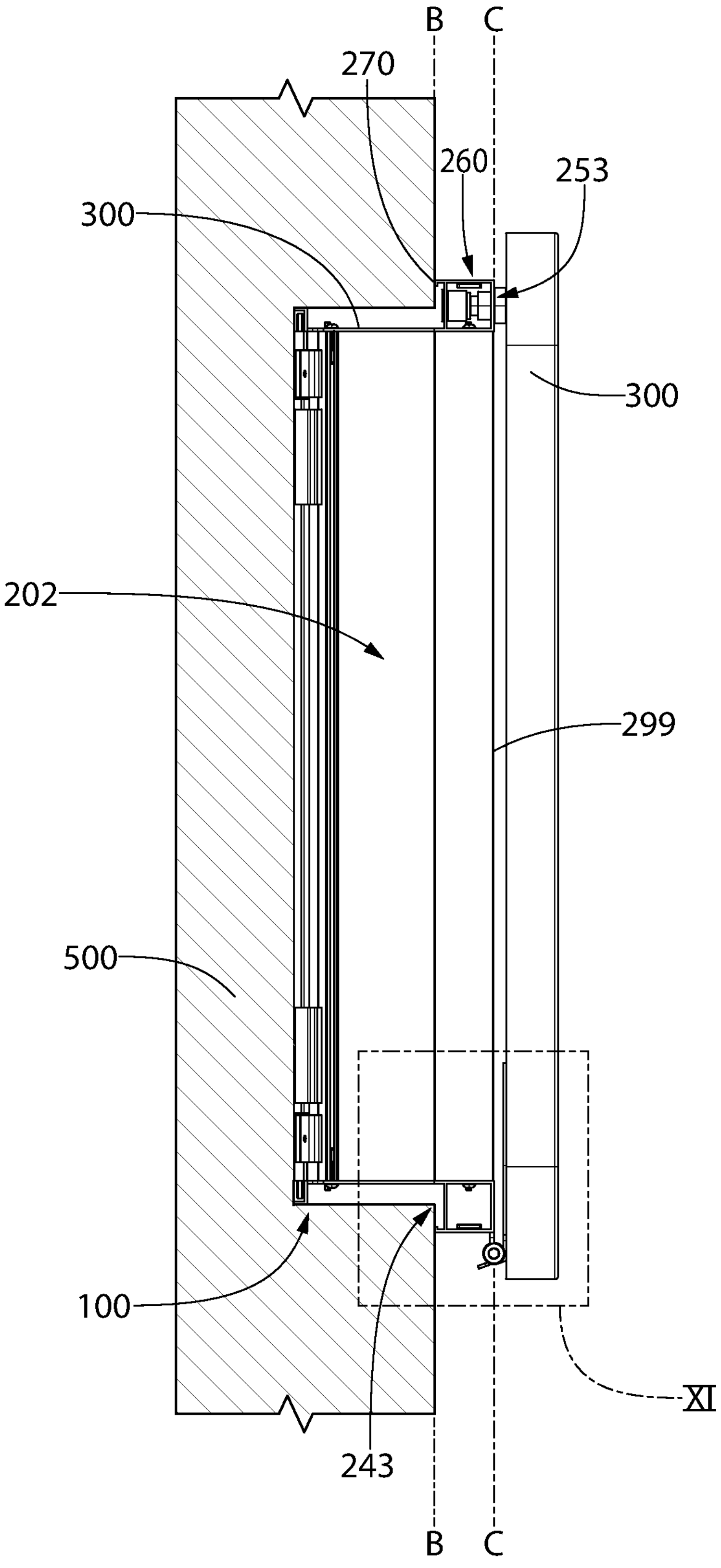
FIG. 10 is a top plan view of an exemplary cabinet apparatus shown recess mounted to a wall with a door of the cabinet apparatus in a closed position.
Figure 11:
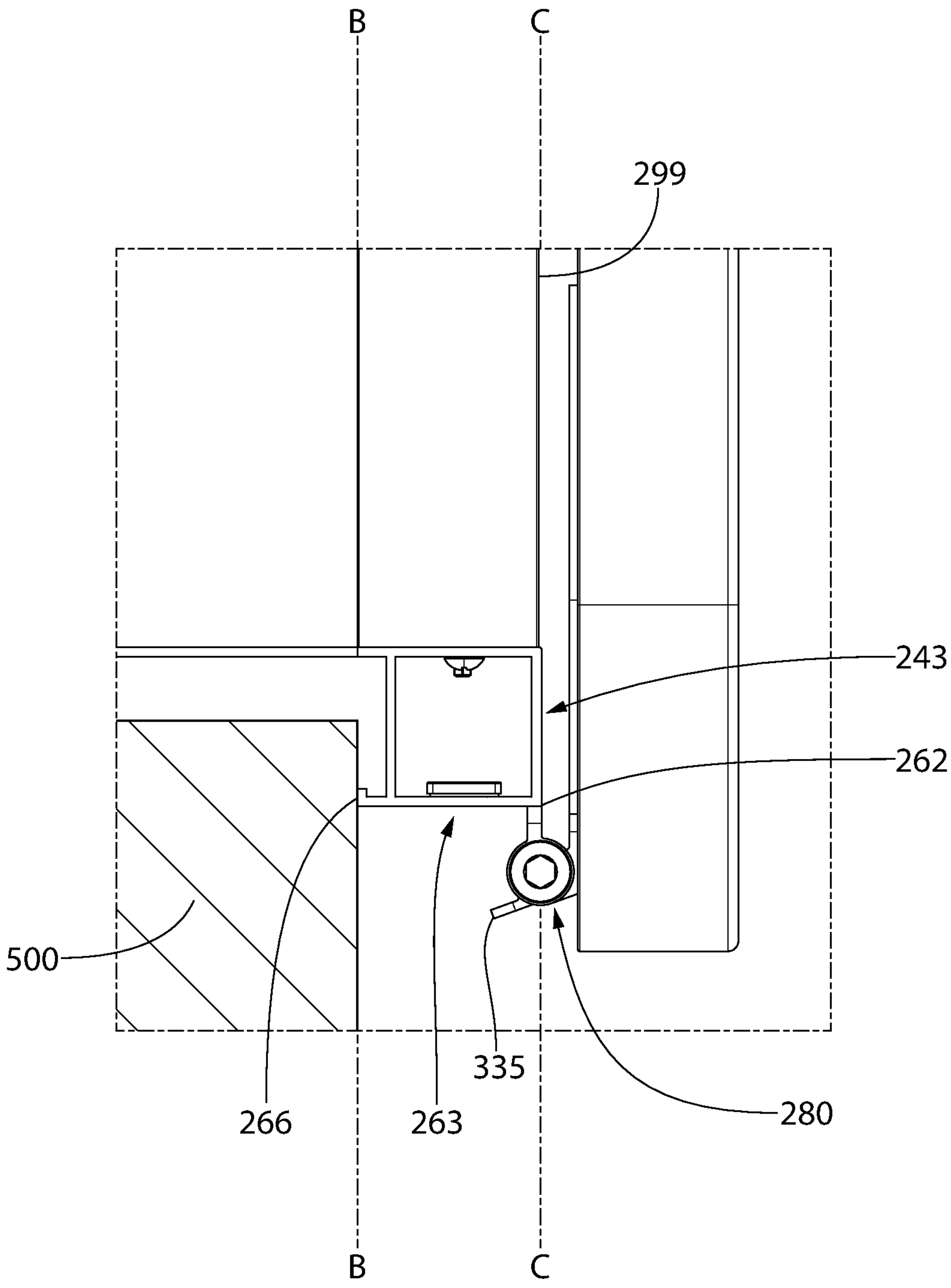
FIG. 11 is a close-up view of area XI of FIG. 10.

Referring to FIGS. 10 and 11 concurrently, when the cabinet apparatus 100 is recess-mounted to the wall 500, the first and second cover members 244, 254 are not attached to the housing 200. This allows the flange 260 to abut against the wall to serve as a stopping point for the insertion of the housing 200 into the wall 500. The flange 260 has a rear-most flange surface 270 that defines a wall contact plane B-B. The rear-most flange surface 270 may be formed by the distal end 266 of the abutment lip 263 of the left flange portion 243 (as well as by a distal end of an abutment lip of the second flange portion 253). The rear-most flange surface 270 may also be formed by distal edges of the horizontal wall portion 228 of the top flange portion 221 and distal edges of the horizontal wall portion 235 of the bottom flange portion 209.

The front access opening 299 of the storage space 202 lies in a first reference plane C-C. The first hinge component 280 protrudes from the front-outside corner 262 of the left flange portion 243 in a direction that is substantially parallel to the first reference plane C-C. The first reference plane C-C is also parallel to the wall contact plane B-B. Thus, the first hinge component 280 protrudes from the front-outside corner 262 of the left flange portion 243 in a direction that is substantially parallel to the wall contact plane B-B.

Figure 12:
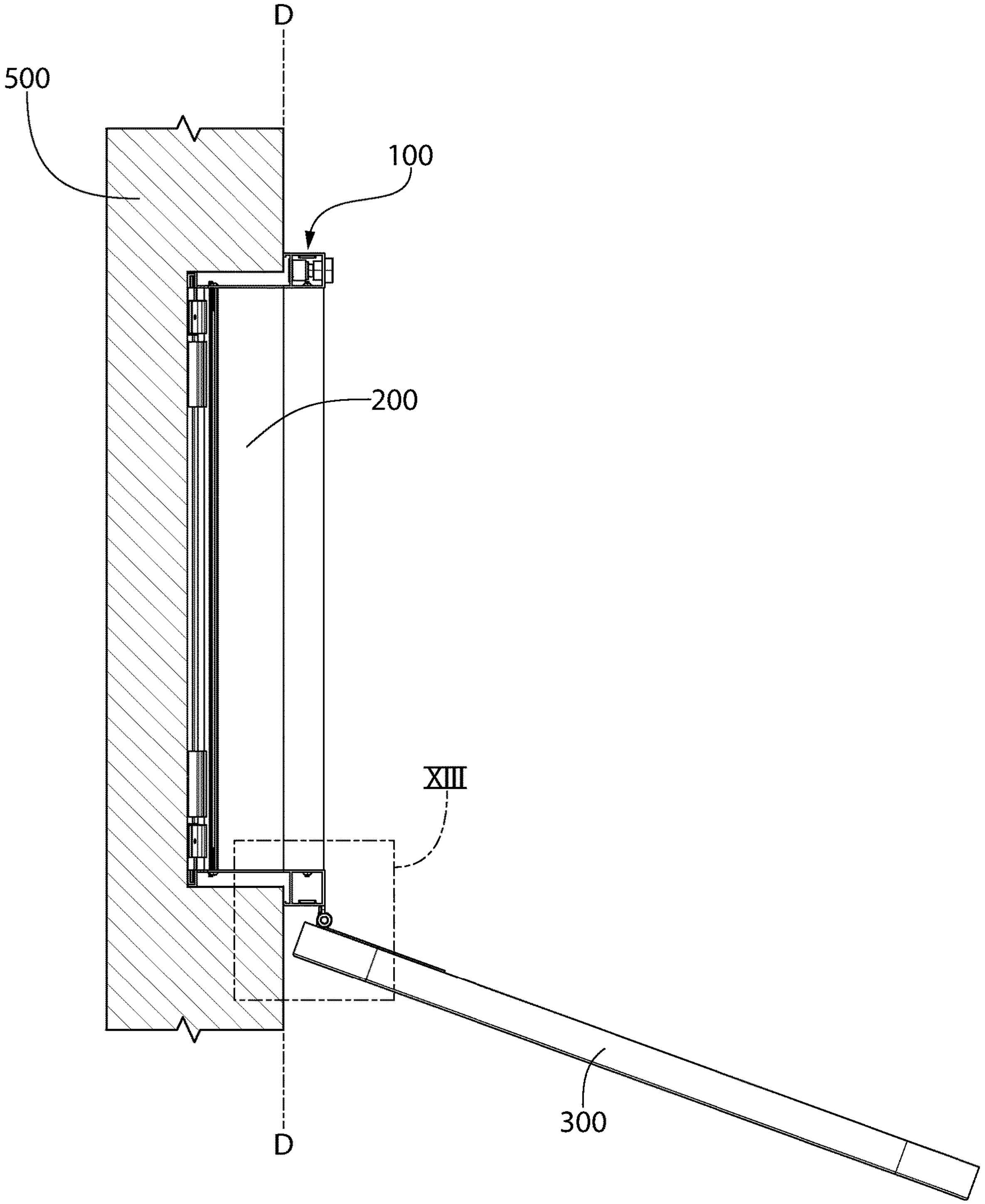
FIG. 12 is a top plan view of an exemplary cabinet apparatus shown recess mounted to a wall with a door of the cabinet apparatus in an open position.
Figure 13:
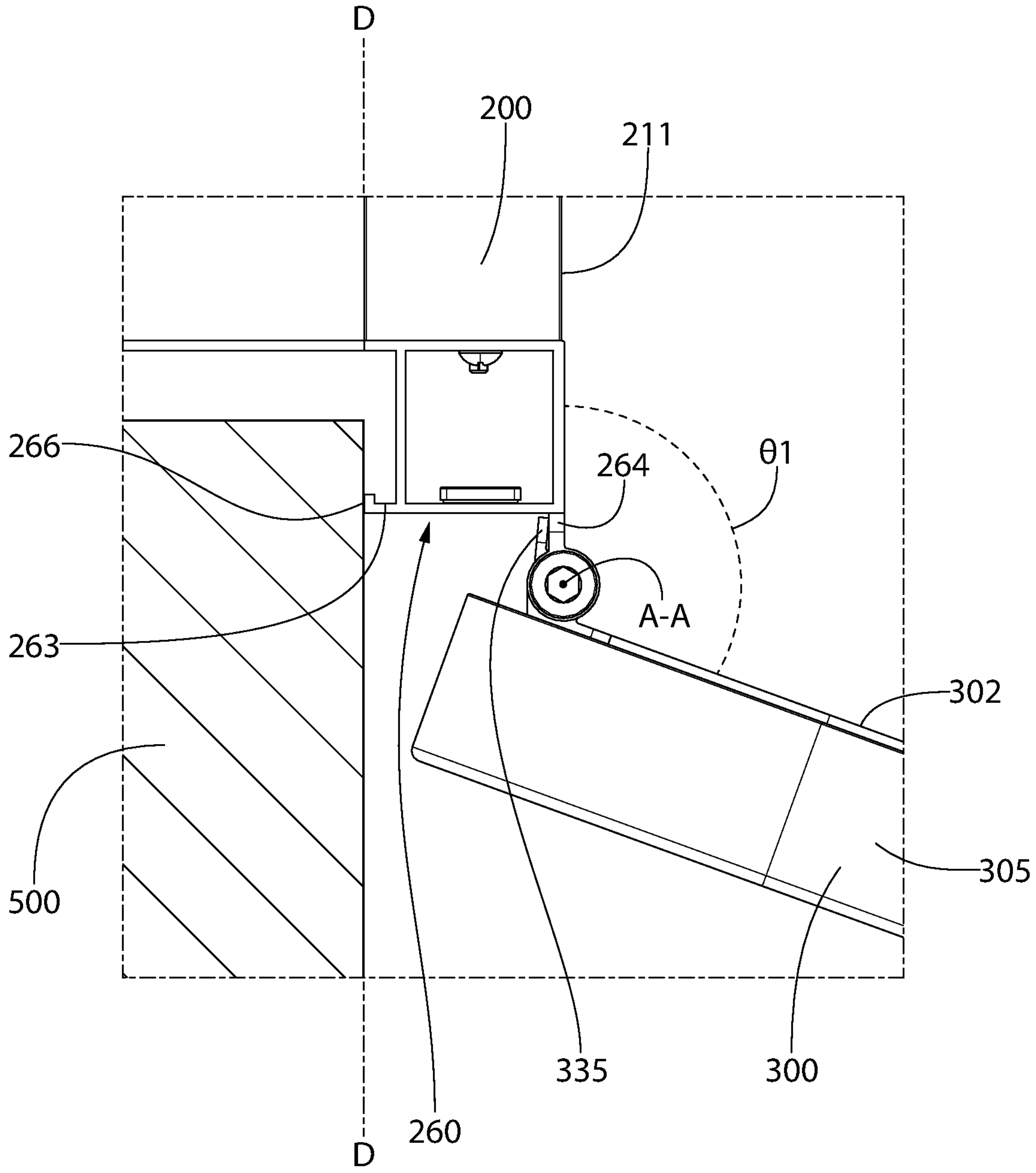
FIG. 13 is a close-up view of area XIII of FIG. 12.

FIGS. 12 and 13 illustrate the same view as FIGS. 10 and 11, except with the door 300 having been altered into the fully-open position. The hinge stop 335 of the door 300 and the stop lip 264 of the housing 200 are configured to interact with one another to prevent the door 300 from being rotated about the rotational axis A-A relative to the housing 200 beyond a predetermined angular position relative to the closed position, with the predetermined angular position being a fully open position of the door 300 relative to the housing 200. The distal end 266 of the abutment lip 263 lies in a reference plane D-D which is substantially parallel to the reference plane C-C in which the front access opening 299 lies. The reference plane D-D may be the same plane as the wall contact plane B-B described previously. When the door 300 is in the fully-open position, no portion of the door 300 intersects the reference plane D-D. This ensures that no portion of the door 300 contacts, abuts, or scrapes the wall 500 when the door 300 is transitioned from the fully-closed position to the fully-open position. The door 300 may be unable to open beyond the full-open position due to the interaction between the hinge stop 335 and the stop lip 264.

The predetermined angular position may be an angle Θ1 formed between the interior surface 302 of the door 300 and the front face 211 of the housing 200, or may be the angle to which the door 300 is altered when moving from its fully-closed position to its fully-open position. The predetermined angular position may be greater than 90° from the closed position. The predetermined angular position may be at least 110° from the closed position.

While in the example shown the hinge stop 335 is located on the door 300 and abuts against the stop lip 264 on the housing 200 when the door 300 is in the fully-open position, alternative arrangements are possible. For example, in one alternative the hinge stop may be a feature located on the housing 200 which may abut or contact the door body 305 upon the door 300 being rotated into the fully-open position. In another alternative, the hinge stop 335 may remain on the door 300 but may contact part of the flange 260 directly rather than the stop lip 264 that protrudes from the flange 260.

Figure 14:
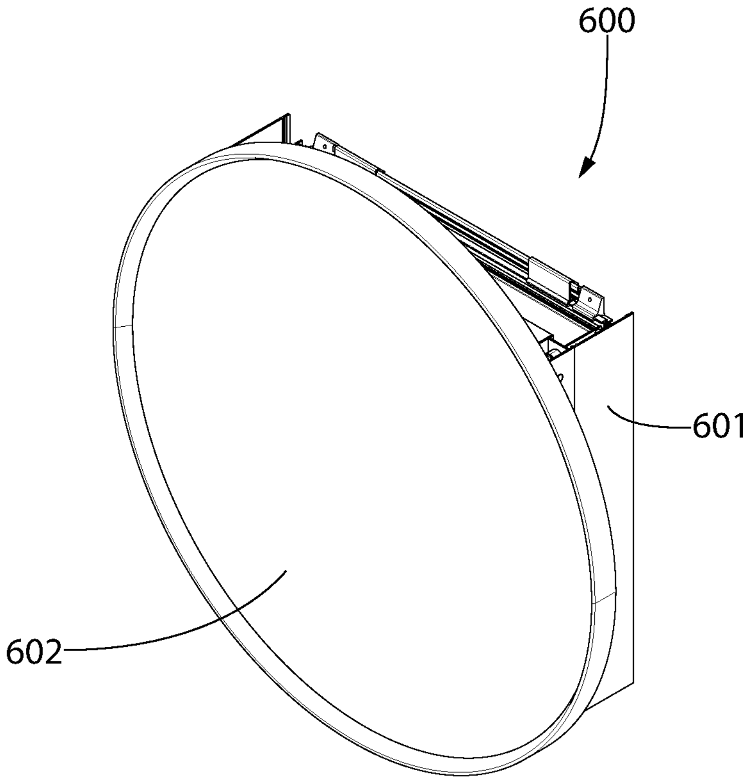
FIG. 14 is a front perspective view of an example cabinet assembly having a housing and a door with the door in a closed position.
Figure 15:
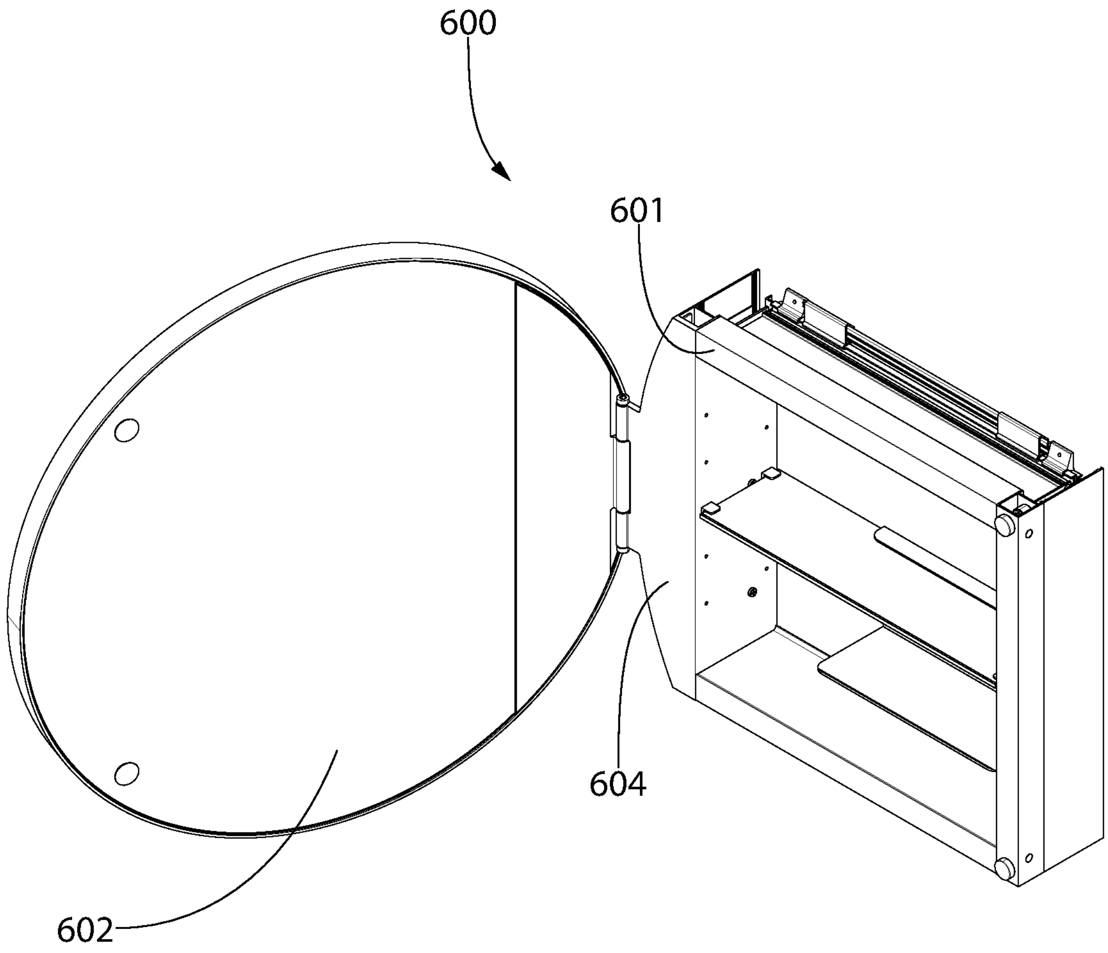
FIG. 15 is a front perspective view of an example cabinet assembly having a housing and a door with the door in a partially opened position.

Referring to FIGS. 14 and 15, a cabinet apparatus 600 is illustrated. The cabinet apparatus 600 includes a housing 601 and a door 602 that is pivotably coupled to the housing 601. The features of the cabinet apparatus 100 described above are entirely applicable to the cabinet apparatus 600. The only substantive difference, other than the size of the cabinet apparatus 600 relative to the cabinet apparatus 100, is that the door 602 is round instead of rectangular. However, all of the other features including those regarding the hinge components, the flange and flange features, and the like are included in the cabinet apparatus 600. The housing 601 may have an extension 604 along the left side where the hinge component is located to better enable the door 602 to fully close the access opening of the housing 601 when in the closed position. Otherwise, the features of the cabinet apparatus 600 are essentially the same as the cabinet apparatus 100 described above.

While the invention has been described with respect to specific examples including presently preferred modes of carrying out the invention, those skilled in the art will appreciate that there are numerous variations and permutations of the above-described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A cabinet apparatus comprising:

a housing defining a storage space having a front access opening, the housing comprising:

a rear panel;

a first panel structure comprising:

a first sidewall panel structure having a first interior surface that partially defines the storage space and a first exterior surface opposite the first interior surface; and a tubular flange extending lengthwise along the first sidewall panel structure and protruding from the first exterior surface of the first sidewall panel structure, the tubular flange including a front wall, an outer wall, a rear wall, and an inner wall that collectively define a tubular cavity, the outer wall extending beyond the rear wall to form an abutment lip protruding from an exterior surface of the rear wall, the abutment lip abutting a wall surface when the cabinet apparatus is recess mounted into the wall; and a first hinge component on the tubular flange of the first panel structure;

a door comprising:

a door body; and a second hinge component on the door body;

the first and second hinge components operably coupled to one another so that the door is pivotably mounted to the housing to be rotatable about a rotational axis between: (1) a closed position in which the door body encloses the front access opening; and (2) an open position in which the storage space is accessible via the front access opening, the second hinge component comprising a hinge stop, the front wall extending beyond the outer wall to form a stop lip that protrudes from an exterior surface of the outer wall, and the hinge stop and stop lip configured to interact with one another to prevent the door from being rotated about the rotational axis relative to the housing beyond a predetermined angular position relative to the closed position, the predetermined angular position being a fully open position of the door relative to the housing, wherein the rear panel and the first panel structure are separately formed and subsequently coupled to form the housing.

2. The cabinet apparatus according to claim 1 wherein a front portion of the first sidewall panel structure forms the inner wall of the tubular flange and the first sidewall panel structure and the tubular flange are a singular monolithic component.

3. The cabinet apparatus according to claim 1 further comprising:

the first hinge component comprising a first hinge knuckle protruding from the tubular flange;

the second hinge component further comprising a second hinge knuckle protruding from a rear surface of the door body;

a first hinge pin extending through and pivotably coupling the first and second hinge knuckles together; and the hinge stop protruding from a cylindrical body of the second hinge knuckle.

4. The cabinet apparatus according to claim 1 wherein the first hinge component is located at and protrudes from a front-outside corner of the tubular flange, wherein the first hinge component protrudes from the front-outside corner of the tubular flange in a direction substantially parallel to a first reference plane in which the front access opening lies.

5. The cabinet apparatus according to claim 1 wherein the first hinge component comprises: a first rib protruding from the tubular flange; and a first hinge knuckle located at a distal end of the first rib, wherein the first sidewall panel structure, the tubular flange, and the first hinge component are formed as a singular monolithic component, and wherein the singular monolithic component is an extruded component.

6. The cabinet apparatus according to claim 1 wherein when the door is in the fully-open position, no portion of the door intersects a second reference plane in which a distal edge surface of the abutment lip lies, the second reference plane being substantially parallel to a first reference plane in which the front access opening lies.

7. The cabinet apparatus according to claim 1 further comprising:

the first hinge component comprising an upper first hinge knuckle protruding from the tubular flange at a top of the tubular flange and a lower first hinge knuckle protruding from the tubular flange at a bottom of the tubular flange;

the second hinge component further comprising a second hinge knuckle protruding from a rear surface of the door body;

a first hinge pin extending through and pivotably coupling the upper first hinge knuckle and the second hinge knuckle together; and a second hinge pin extending through and pivotably coupling the lower first hinge knuckle and the second hinge knuckle together.

8. The cabinet apparatus of claim 1, wherein the abutment lip includes a distal end which abuts the wall surface when the cabinet apparatus is recess mounted in the wall, the distal end having an increased thickness relative to a remainder of the abutment lip.

9. The cabinet apparatus of claim 1, wherein the housing includes a magnetic element disposed on a front face of the housing, and wherein an interior surface of the door includes a pocket, the magnetic element disposed in the pocket when the door is in the closed position.

10. A cabinet apparatus comprising:

a housing comprising:

a compartment body defining a storage space having a front access opening, the compartment body comprising:

a rear panel; and a panel structure having a first sidewall panel structure and a tubular flange extending along the first sidewall panel structure, the tubular flange protruding outward from the compartment body and including a front wall, an outer wall, a real wall, and an inner wall that collectively define a tubular cavity, the outer wall extending beyond the rear wall to form an abutment lip abutting a surface of a wall when the cabinet apparatus is recess-mounted into the wall, the tubular flange having a rear-most flange surface defining a wall contact plane;

a first hinge component on the flange; and a door comprising:

a door body; and a second hinge component on the door body;

the first and second hinge components operably coupled to one another so that the door is pivotably mounted to the housing to be rotatable about a rotational axis between: (1) a closed position in which the door body encloses the front access opening; and (2) a fully-open position in which the storage space is accessible via the front access opening and no portion of the door intersects the wall contact plane; and a stop configured to prevent the door from being rotated about the rotational axis relative to the housing beyond a predetermined angular position relative to the closed-position, the predetermined angular position being the fully-open position, wherein the rear panel and the first panel structure are separately formed and subsequently coupled to form the housing.

11. The cabinet apparatus according to claim 10 wherein the predetermined angular position is at least one of: greater than 90 degrees from the closed position, or at least 110 degrees from the closed position.

12. The cabinet apparatus according to claim 10 wherein the stop comprises a hinge stop, one of the first and second hinge components comprising the hinge stop, wherein the hinge stop is a tab configured to contact one of the flange or door body upon the door being rotated into the fully-open position from the closed position.

13. The cabinet apparatus according to claim 10 further comprising:

the first hinge component comprising a first hinge knuckle protruding from a front-outside corner of the flange in a direction substantially parallel to the wall contact plane;

the second hinge component comprising a second hinge knuckle protruding from a rear surface of the door body; and a first hinge pin extending through and pivotably coupling the first and second hinge knuckles together.

14. The cabinet apparatus according to claim 10 wherein the stop comprises a stop lip, the flange comprising the stop lip.

15. The cabinet apparatus according to claim 10 wherein the flange surrounds the front access opening.

16. The cabinet apparatus according to claim 10 wherein:

the first sidewall panel structure having an interior surface that partially defines the storage space and an exterior surface opposite the interior surface;

the flange circumscribing the front access opening and comprising a front wall protruding from the exterior surfaces and an outer wall extending rearward from the front wall and terminating in a rear-most flange surface, wherein left and right-side portions of the flange are tubular structures and the upper and lower portions of the flange are open channel structures.

17. A cabinet apparatus comprising:

a housing defining a storage space having a front access opening, the housing comprising:

a rear panel;

a first panel structure comprising:

a first sidewall panel structure having a first interior surface that partially defines the storage space and a first exterior surface opposite the first interior surface;

a tubular flange extending lengthwise along the first side wall panel structure and protruding from the first exterior surface of the first sidewall panel structure, the tubular flange including a front wall, an outer wall, a rear wall, and an inner wall that collectively define a tubular cavity, the outer wall extending beyond the rear wall to form an abutment lip that protrudes from an exterior surface of the rear wall, the abutment lip abutting a wall surface when the cabinet apparatus is recess-mounted into a wall; and a first hinge component; and wherein the first panel structure is an integrally formed singular monolithic component;

a door comprising:

a door body; and a second hinge component on the door body;

the first and second hinge components operably coupled to one another so that the door is pivotably mounted to the housing to be rotatable about a rotational axis between: (1) a closed position in which the door body encloses the front access opening; and (2) an open position in which the storage space is accessible via the front access opening, wherein the rear panel and the first panel structure are separately formed and subsequently coupled to form the housing, wherein the housing includes a magnetic element disposed on a front face of the housing, and wherein an interior surface of the door includes a pocket, the magnetic element disposed in the pocket when the door is in the closed position.

18. The cabinet apparatus according to claim 17 wherein the first panel structure is an extruded component, the cabinet apparatus further comprising:

the first hinge component comprising a first hinge knuckle;

the second hinge component comprising a second hinge knuckle; and a first hinge pin extending through and pivotably coupling the first and second hinge knuckles together.

19. A cabinet apparatus comprising:

a housing defining a storage space having a front access opening, the housing comprising:

a rear panel;

a first panel structure comprising:

a first sidewall panel structure having a first interior surface that partially defines the storage space and a first exterior surface opposite the first interior surface; and a tubular flange extending lengthwise along the first sidewall panel structure and protruding from the first exterior surface of the first sidewall panel structure, the tubular flange including a front wall, an outer wall, a rear wall, and an inner wall that collectively define a tubular cavity, the outer wall extending beyond the rear wall to form an abutment lip protruding from an exterior surface of the rear wall; and a first hinge component on the tubular flange of the first panel structure;

a door comprising:

a door body; and a second hinge component on the door body, the first and second hinge components operably coupled to one another so that the door is pivotably mounted to the housing to be rotatable about a rotational axis between: (1) a closed position in which the door body encloses the front access opening; and (2) an open position in which the storage space is accessible via the front access opening, and a cover member detachably coupled to the first panel structure, wherein an edge of the cover member abuts a distal end of the abutment lip, and wherein a surface of the cover member is flush with an exterior surface of the outer wall of the tubular flange.

* * * * *